US012615607B2

(12) United States Patent
Velev et al.

(10) Patent No.: US 12,615,607 B2
(45) Date of Patent: Apr. 28, 2026

(54) CONNECTION SUSPENSION FOR MULTIPLE SIMS

(71) Applicant: Lenovo (Singapore) PTE. LTD., New Tech Park (SG)

(72) Inventors: Genadi Velev, Darmstadt (DE); Apostolis Salkintzis, Athens (GR); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 542 days.

(21) Appl. No.: 17/279,075

(22) PCT Filed: Sep. 6, 2019

(86) PCT No.: PCT/EP2019/073833
§ 371 (c)(1),
(2) Date: Mar. 23, 2021

(87) PCT Pub. No.: WO2021/043417
PCT Pub. Date: Mar. 11, 2021

(65) Prior Publication Data
US 2022/0053448 A1 Feb. 17, 2022

(51) Int. Cl.
*H04W 60/00* (2009.01)
*H04W 8/18* (2009.01)
(Continued)

(52) U.S. Cl.
CPC ......... *H04W 60/005* (2013.01); *H04W 8/183* (2013.01); *H04W 76/38* (2018.02); *H04W 88/06* (2013.01)

(58) Field of Classification Search
None
See application file for complete search history.

(56) References Cited

U.S. PATENT DOCUMENTS

2014/0148178 A1 5/2014 Wippich
2015/0094071 A1 4/2015 Hang et al.
(Continued)

FOREIGN PATENT DOCUMENTS

WO 2014204682 A2 12/2014
WO 2019076439 A1 4/2019

OTHER PUBLICATIONS

International Application No. PCT/EP2019/073833, "Notification of Transmittal of the International Search Report and the Written Opinion of the International Searching Authority, or the Declaration" dated Jun. 19, 2020, pp. 1-12.
(Continued)

*Primary Examiner* — Frantz Bataille
(74) *Attorney, Agent, or Firm* — Kunzler Bean & Adamson

(57) ABSTRACT

Apparatuses, methods, and systems are disclosed for connection suspension of a SIM. One apparatus includes a processor, a first SIM registered with a first mobile communication network, a second SIM registered with a second mobile communication network, and a transceiver that communicates with the first and second mobile communication networks. The processor receives a communication trigger associated with the first SIM, the communication trigger indicating a service type and determines whether to apply a short connection suspension for the second SIM or a long connection suspension for the second SIM, said determination based on the service type. The processor additionally applies the selected one of the short connection suspension and the long connection suspension for the second SIM.

21 Claims, 12 Drawing Sheets

(51) Int. Cl.
   *H04W 76/38*      (2018.01)
   *H04W 88/06*      (2009.01)

(56)                    References Cited

U.S. PATENT DOCUMENTS

2018/0160422 A1*  6/2018  Pathak ................. H04W 76/10
2019/0053130 A1*  2/2019  Guo ..................... H04L 1/0026

OTHER PUBLICATIONS

Intel et al., "Enhancements for Dual Registration mode of operation", SA WG2 Meeting #128 S2-186373, Jul. 2-6, 2018, pp. 1-10.
3GPP, "3rd Generation Partnership Project; Technical Specification Group Services and System Aspects; Vocabulary for 3GPP Specifications (Release 17)", 3GPP TR 21.905 V17.0.0, Jul. 2020, pp. 1-65.
3GPP, "3rd Generation Partnership Project; Technical Specification Group Services and System Aspects; Procedures for the 5G System (5GS); Stage 2 (Release 16)", 3GPP TS 23.502 V16.5.0, Jul. 2020, pp. 1-594.
3GPP, "3rd Generation Partnership Project; Technical Specification Group Radio Access Network; NR; NR and NG-RAN Overall Description; Stage 2 (Release 16)", 3GPP TS 38.300 V16.1.0, Mar. 2020, pp. 1-133.

\* cited by examiner

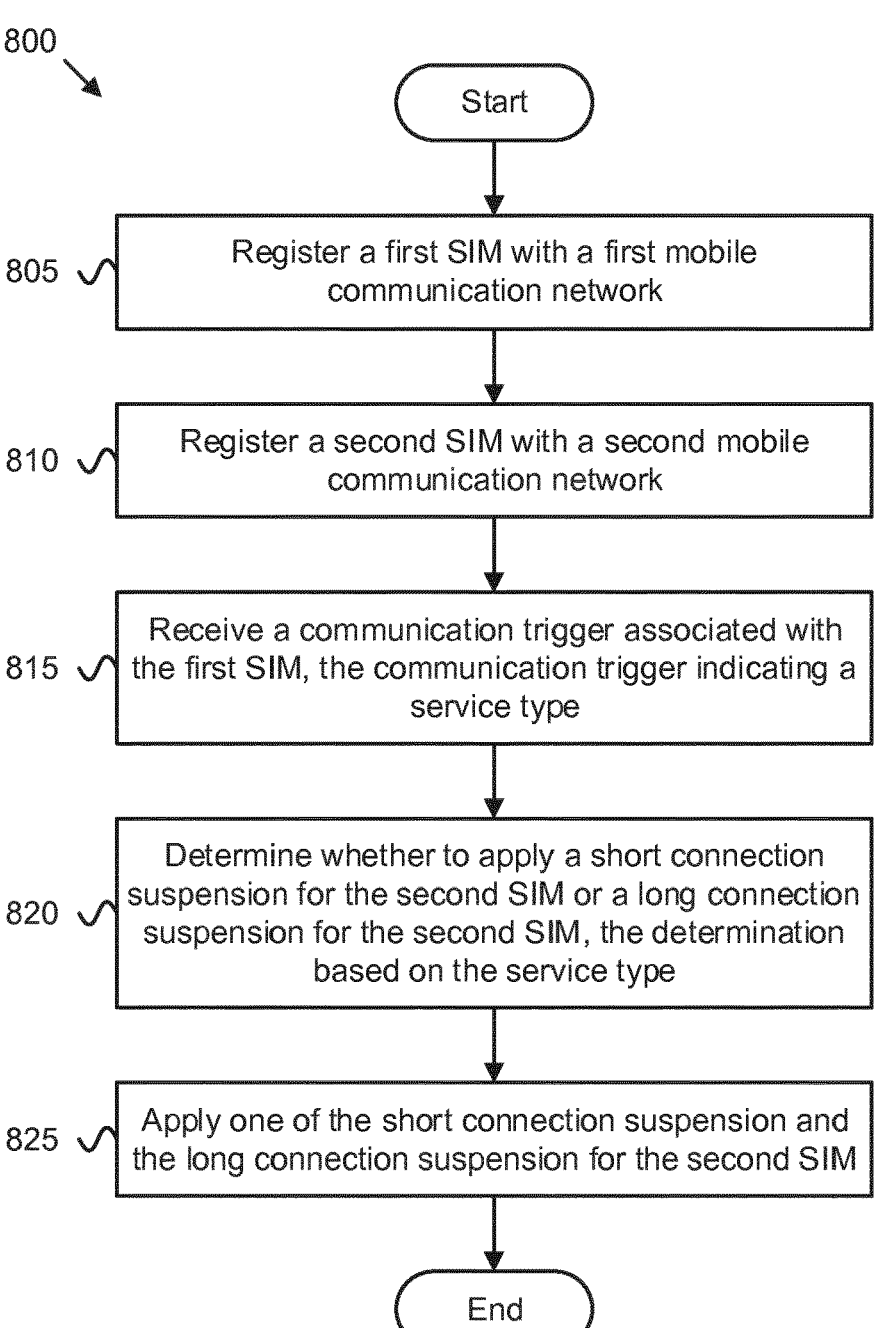

800

Start

805    Register a first SIM with a first mobile communication network

810    Register a second SIM with a second mobile communication network

815    Receive a communication trigger associated with the first SIM, the communication trigger indicating a service type 820    Determine whether to apply a short connection suspension for the second SIM or a long connection suspension for the second SIM, the determination based on the service type 825    Apply one of the short connection suspension and the long connection suspension for the second SIM End

Start

905 — Receive an RRC layer suspension request from a UE

910 — Maintain a UE AS context for the UE

915 — Disable downlink transmissions to the UE in response to the RRC layer suspension request 920 — Enable downlink transmissions to the UE in response to receiving an RRC layer connection resume request from the UE End

CONNECTION SUSPENSION FOR MULTIPLE SIMS

The subject matter disclosed herein relates generally to wireless communications and more particularly relates to suspending a connection of one SIM during multi-SIM operation.

BACKGROUND

The following abbreviations and acronyms are herewith defined, at least some of which are referred to within the following description.

Third Generation Partnership Project ("3GPP"), Fifth-Generation Core ("5GC"), Fifth-Generation QoS Indicator ("5QI"), Access and Mobility Management Function ("AMF"), Access Network Performance ("ANP"), Access Point Name ("APN"), Access Stratum ("AS"), Access Traffic Steering, Switching and Splitting ("ATSSS"), Allocation/Retention Policy ("ARP"), Application Programing Interface ("API"), Common Search Space ("CSS"), Data Network Name ("DNN"), Data Radio Bearer ("DRB"), Differentiated Services Code Point ("DSCP"), Downlink ("DL"), Enhanced Mobile Broadband ("eMBB"), Encapsulating Security Payload ("ESP"), Evolved Node-B ("eNB"), Evolved Packet Core ("EPC"), Evolved UMTS Terrestrial Radio Access Network ("E-UTRAN"), European Telecommunications Standards Institute ("ETSI"), Echo Acknowledgement Indicator ("EAI"), Request Indicator ("ERI", ERI-d refers to an ERI associated with a dummy payload and ERI-v refers to an ERI associated with a valid payload), Globally Unique Temporary UE Identity ("GUTI"), General Packet Radio Service ("GPRS"), GPRS Tunneling Protocol ("GTP", GTP-C refers to control signal tunneling while GTP-U refers to user data tunneling), Home Subscriber Server ("HSS"), Internet-of-Things ("IoT"), IP Multimedia Subsystem ("IMS," aka "IP Multimedia Core Network Subsystem"), Internet Protocol ("IP"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobile Network Operator ("MNO"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Public Land Mobile Network ("PLMN"), Quality of Service ("QoS"), QoS Class Identifier ("QCI"), Registration Area ("RA"), Radio Access Network ("RAN"), Radio Access Technology ("RAT"), Radio Resource Control ("RRC"), Receive ("RX"), Single Network Slice Selection Assistance Information ("S-NSSAI"), Scheduling Request ("SR"), Secure User Plane Location ("SUPL"), Serving Gateway ("SGW"), Session Management Function ("SMF"), Stream Control Transmission Protocol ("SCTP"), System Information Block ("SIB"), Tracking Area ("TA"), Transmission Control Protocol ("TCP"), Transmit ("TX"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), User Datagram Protocol ("UDP"), UE Route Selection Policy ("URSP"), Unstructured Supplementary Service Data (USSD), Wireless Local Area Network ("WLAN"), and Worldwide Interoperability for Microwave Access ("WiMAX").

Certain UEs support multiple subscriber identity modules, e.g., USIM-1 and USIM-2, to same MNO or different MNOs. The following modes of operation of Multi/Dual-USIM devices are defined in GSMA TS.37 document: Passive, Dual-SIM/Dual-Standby, and Dual-SIM/Dual-Active.

In Passive mode the UE contains two SIMs, but only one can be selected for use at any given time. Passive Dual SIM devices are effectively a single SIM device as the SIMs share a single transceiver and the UE only has logical connection to a single network at any given time. With other words, only a single USIM module/profile is registered in a given time.

In Dual SIM Dual Standby (DSDS) mode both SIMs can be used for idle-mode network connection, but when a radio connection is active the second connection is disabled. As in the passive case, the SIMs in a DSDS device share a single transceiver. Through time multiplexing two radio connections are maintained in idle mode. When in-call on network for one SIM it is no longer possible to maintain radio connection to the network of the second SIM, hence that connection is unavailable for the duration of the call. Registration to the second network is maintained. The UE is to maintain idle operation on one subscription while on a best effort data connection on the other subscription.

Dual SIM Dual Active (DSDA): both SIMs can be used in both idle and connected modes. Each SIM has a dedicated transceiver, meaning that there are no interdependencies on idle or connected mode operation at the modem level. Note that in some DSDA devices the second transceiver may be 2G-only.

BRIEF SUMMARY

Methods for suspending a connection of one SIM during multi-SIM operation are disclosed. Apparatuses and systems also perform the functions of the methods.

A method of a UE for suspending a connection of one SIM during multi-SIM operation includes registering a first SIM with a first mobile communication network and registering a second SIM with a second mobile communication network. The first method includes receiving a communication trigger associated with the first SIM, the communication trigger indicating a service type and determining whether to apply a short connection suspension for the second SIM or a long connection suspension for the second SIM. Here, the determination is based on the service type. The first method includes applying one of the short connection suspension and the long connection suspension for the second SIM.

A method of a network function (e.g., eNB or gNB) for suspending a connection of one SIM during multi-SIM operation includes receiving an RRC layer suspension request from a UE. The method includes maintaining a UE AS context for the UE. The method includes disabling downlink transmissions to the UE in response to the RRC layer suspension request. The method includes enabling downlink transmissions to the UE in response to receiving an RRC layer connection resume request from the UE.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a flow chart diagram illustrating one embodiment of a first method for suspending a connection of one SIM during multi-SIM operation.

DETAILED DESCRIPTION

Figure 1:
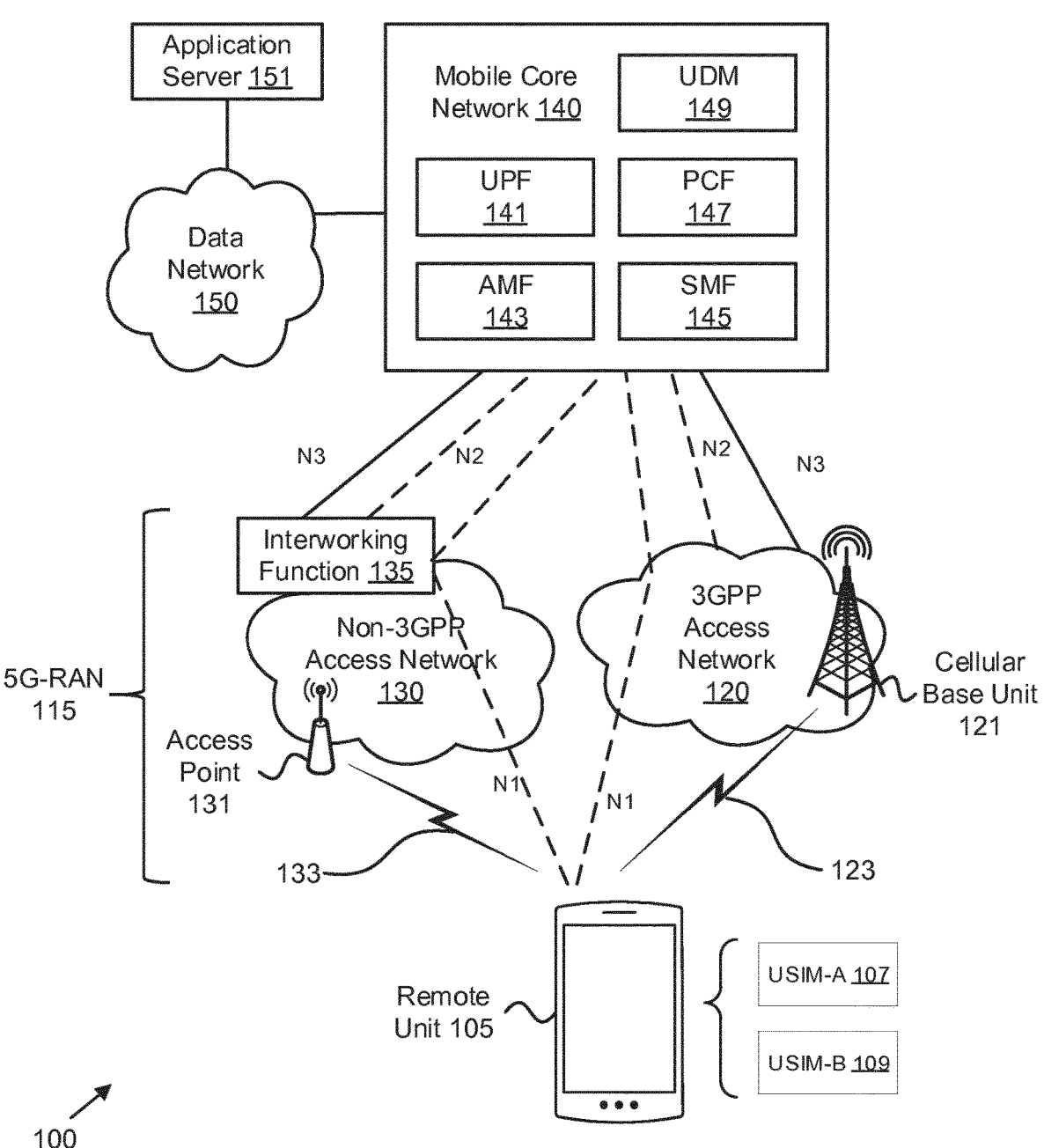
FIG. 1 is a schematic block diagram illustrating one embodiment of a wireless communication system for suspending a connection of one SIM during multi-SIM operation.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for suspending a connection of one SIM during multi-SIM operation. In various embodiments, the disclosure introduces enhancements to DSDS mode of operation for a multi-SIM UE, where the UE can dynamically decide which connection to use, e.g., connection for USIM-A or connection for USIM-B, independent whether there is already any existing connection to any USIM. Note that "existing connection" means, e.g., an existing NAS connection where the UE is in CM-Connected state for one USIM.

Disclosed herein are mechanisms allowing for suspension (e.g., interruption) and resumption of an ongoing connection in the network associated with USIM-A, so that the UE can temporarily leave to the network associated with USIM-B, and then return to the network associated with USIM-A in a network-controlled manner. Various embodiments describe optimizations for temporarily suspending a connection for one USIM (e.g. for USIM-A) in an effective way by reducing the control plane signaling for suspension and resumption. Various embodiments describe the network behavior while the ongoing connection in the network associated with USIM-A is suspended, for example addressing whether the PLMN-A of USIM-A (e.g., SMF/UPF) should buffer or store the DL packets, how GBR QoS flows are treated, and what procedure is used by the UE to resume the suspended connection for USIM-A and which information is exchanged between the UE and the network during connection resumption.

FIG. 1 depicts a wireless communication system 100 for suspending a connection of one SIM during multi-SIM operation, according to embodiments of the disclosure. In one embodiment, the wireless communication system 100 includes at least one remote unit 105, a 5G-RAN 115, and a mobile core network 140. The 5G-RAN 115 and the mobile core network form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as 4G) or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with an application server 151 (or other communication peer) via a network connection with the mobile core network 140. For example, an application in a remote unit 105 (e.g., web browser, media client, telephone/VoIP application) may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the data network 150 (e.g., application server 151) using the PDU session. Note that the remote unit 105 may establish one or more PDU sessions (or other data connections) with the mobile core network 140. As such, the remote unit 105 may have at least one PDU session for communicating with the data network 150. The remote unit 105 may establish additional PDU sessions for communicating with other data network and/or other communication peers.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. Typically, a serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking function 135. The interworking function 135 provides interworking between the remote unit 105 and the mobile core network 140. In some embodiments, the interworking function 135 is a Non-3GPP Interworking Function ("N3IWF") and, in other embodiments, it is a Trusted Non-3GPP Gateway Function ("TNGF"). The N3IWF supports the connection of "untrusted" non-3GPP access networks to the mobile core network (e.g. 5GC), whereas the TNGF supports the connection of "trusted" non-3GPP access networks to the mobile core network. The interworking function 135 supports connectivity to the mobile core network 140 via the "N2" and "N3" interfaces, and it relays "N1" signaling between the remote unit 105 and the AMF 143. As depicted, both the 3GPP access network 120 and the interworking function 135 communicate with the AMF 143 using a "N2" interface. The interworking function 135 also communicates with the UPF 141 using a "N3" interface.

In certain embodiments, a non-3GPP access network 130 may be controlled by an MNO of the mobile core network 140 and may have direct access to the mobile core network 140. Such a non-3GPP AN deployment is referred to as a "trusted non-3GPP access network." A non-3GPP access network 130 is considered as "trusted" when it is operated by the MNO, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network.

In one embodiment, the mobile core network 140 is a 5G core ("5GC") or the evolved packet core ("EPC"), which may be coupled to a data network (e.g., the data network 150, such as the Internet and private data networks, among other data networks. A remote unit 105 may have a subscription or other account with the mobile core network 140.

Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a UPF 141 that serves the 3GPP access network 120 and the non-3GPP access network 130. Note that in certain embodiments, the mobile core network may contain one or more intermediate UPFs, for example a first intermediate UPF that serves the non-3GPP access network 130 and the second intermediate UPF that serves the 3GPP access network 120. In such embodiments, the UPF 141 would be an anchor UPF receiving UP traffic of both intermediate UPFs.

The mobile core network 140 also includes multiple control plane functions including, but not limited to, an Access and Mobility Management Function ("AMF") 143 that serves both the 3GPP access network 120 and the non-3GPP access network 130, a Session Management Function ("SMF") 145, a Policy Control Function ("PCF") 147, and a Unified Data Management function ("UDM") 149. In certain embodiments, the mobile core network 140 may also include an Authentication Server Function ("AUSF"), a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice includes an SMF and a UPF, but the various network slices share the AMF 143, the PCF 147, and the UDM 149. In another example, each network slice includes an AMF, an SMF and a UPF.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like.

As depicted, the remote unit 105 includes the USIM-A 107 and the USIM-B 109. For ease of illustration, the USIM-A 107 and USIM-B 109 are depicted as associated with the same PLMN. Moreover, the USIM-A 107 and USIM-B 109 may be associated with the same or different network slices of the same PLMN. In such a situation, the PLMN may interpret the remote unit 105 as two different remote units having each own registration with the network. In other embodiments, the USIM-A 107 and USIM-B 109 may be associated with different PLMNs.

In certain embodiments, the remote unit 105 receives a communication trigger associated with the first SIM, the communication trigger indicating a service type and, if there is a NAS connection to the second SIM, determines whether to apply a short connection suspension for the second SIM or a long connection suspension for the second SIM, said determination based on the service type. The remote unit

105 additionally applies the selected one of the short connection suspension and the long connection suspension for the second SIM.

In various embodiments, the remote unit 105 is able to indicate to the network (e.g. in Registration request message to AMF 143) during registration procedure the following capabilities: 1) multiple-USIM enhancements support, 2) whether multiple suspend states are supported (e.g. short suspend and long suspend). Based on supported (or preferred) mode of multiple-USIM operation from the network (e.g., indicated in a Registration accept message from AMF 143) the remote unit 105 configures internally whether to: apply a) no multiple-USIM enhancements, b) support of single (e.g. long suspended state) or c) multiple suspended states.

In some embodiments, the remote unit 105 is able to determine whether to apply short or long connection suspension (e.g. based on the indication about the service type in the Paging message, or MO service type, or other indications about the upcoming communication). In case of short suspended state, the remote unit 105 indicates (e.g. in an RRC message) to the source USIM RAN node to enter short suspended state.

In certain embodiments, the remote unit 105 maintains a timer for short suspended state. One or more of following mechanism to configure the timer can be applied: the remote unit 105 may receive timer configuration via unicast message (e.g., suspend accept as part of the RRC signaling procedure for suspension) from the RAN node, or the timer configuration may be broadcasted in the SIB, or the timer configuration may be negotiated during NAS procedure (e.g. registration procedure or UE configuration update). Note that the SIB may advertise multiple-USIM support (i.e. the feature is supported in the network), multiple-USIM preferences, timer value, etc. In certain embodiments, the value of the timer may affect whether the remote unit 105 decides to enter short suspended state or long suspended state.

In some embodiments, the remote unit 105 is able to change its radio capabilities advertised to the network, if the multiple-USIM operation enhancements are preferred and configured in the remote unit 105. For example, the remote unit 105 may change the radio interface capability to not support dual connectivity or certain modes of carrier aggregation, in order to allow camping (e.g. in Idle state) of the remote unit 105 in a different cell (e.g. macro cell) for another USIM. If the remote unit 105 is registered with a network for first USIM and dual radio capabilities are signaled to the network, and the remote unit 105 registers with a network for the a second USIM whereas the multiple-USIM operation enhancements are configured, the remote unit 105 may initiate signaling procedure for changing (e.g. reducing) its radio capability in the network serving the first USIM.

In various embodiments, the 5G-RAN 115 implements means for the short suspend state described in detail below with reference to FIGS. 3 and 4A-4B. The short suspend state may share features with the legacy RRC inactive state, but with the difference that the remote unit 105 is marked as not reachable (i.e., no RAN paging for downlink data or signaling is performed, the RRC connection is suspended even if there is ongoing UL/DL data or signaling transmission (even buffered in e.g. PDCP layer) and/or no RAN notification area is assigned to the UE).

In various embodiments, the AMF 143 (or MME) is able receive the remote unit 105 multiple-USIM capability information. The AMF 143 (or MME) indicates the supported (or preferred) mode of operation, e.g., no multiple-USIM capability, only long suspended state supported, both short and long suspended state supported.

In various embodiments, the remote unit 105 may initiate application/service level signaling before performing a connection suspension procedure to inform the application server 151 (or other communication peer) about the temporary unavailability of the device, so that the service or communication exchange can be interrupted (or paused or terminated) at the application/service layer in a controlled way. When the suspended USIM is restored/resumed, the remote unit 105 may inform the application server 151 (or communication peer) of its availability available for communication.

Additional details for suspending and resuming a connection of one SIM during multi-SIM operation are discussed below.

Figure 2A:
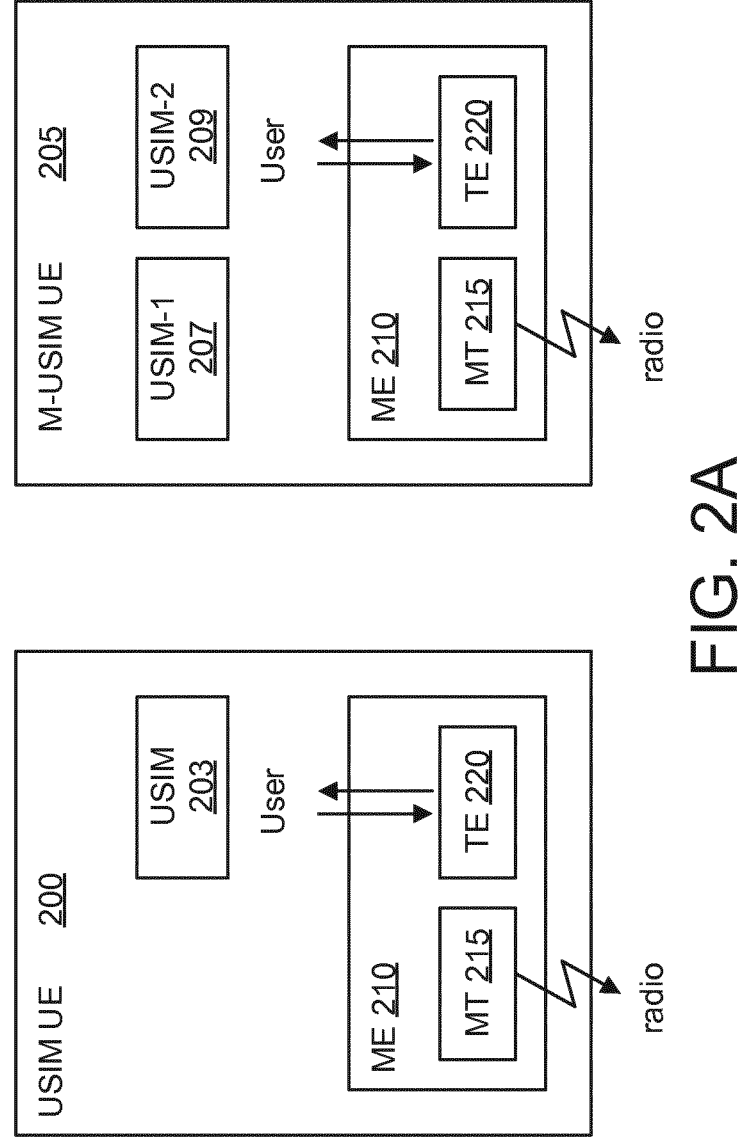
FIG. 2A is a block diagram illustrating one embodiment of a single USIM UE and a multi-USIM UE.

FIG. 2A depicts both a single USIM UE 200 and a multi-USIM UE 205, according to embodiments of the disclosure. The UE 200 comprises a Mobile Equipment ("ME") 210 with a single USIM 203 registered for use at a time, while the multi-USIM UE 205 includes an ME with multiple USIMs (e.g., a first USIM (USIM-1) 207 and a second USIM (USIM-2) 209) registered for use at the same time. The USIM-1 207 and USIM-2 209 may be associated with the same PLMN or different PLMNs. Moreover, the USIM-1 207 and USIM-2 209 may be associated with different network slices of the same PLMN. Note that both USIM-1 207 and USIM-2 209 can be used for idle mode network connection at the same time.

Each ME 210 (e.g. transceiver or modem) includes (1) one or more Mobile Terminations (MT) 215 specific to management of the PLMN access interface (3GPP or non-3GPP); and (2) one or more Terminal Equipment (TE) 220 functions necessary for the operation of the access protocols by the user. Please note that the UE 200 and multi-USIM UE 205 can implement the universal subscriber identity module(s) ("USIM", sometimes referred as subscriber identification module, "SIM") as an integrated circuit or card which needs to be inserted in the UE, and/or as embedded-SIM ("eSIM") or embedded universal integrated circuit card ("eUICC")—a form of programmable SIM that is embedded directly into a device.

Figure 2B:
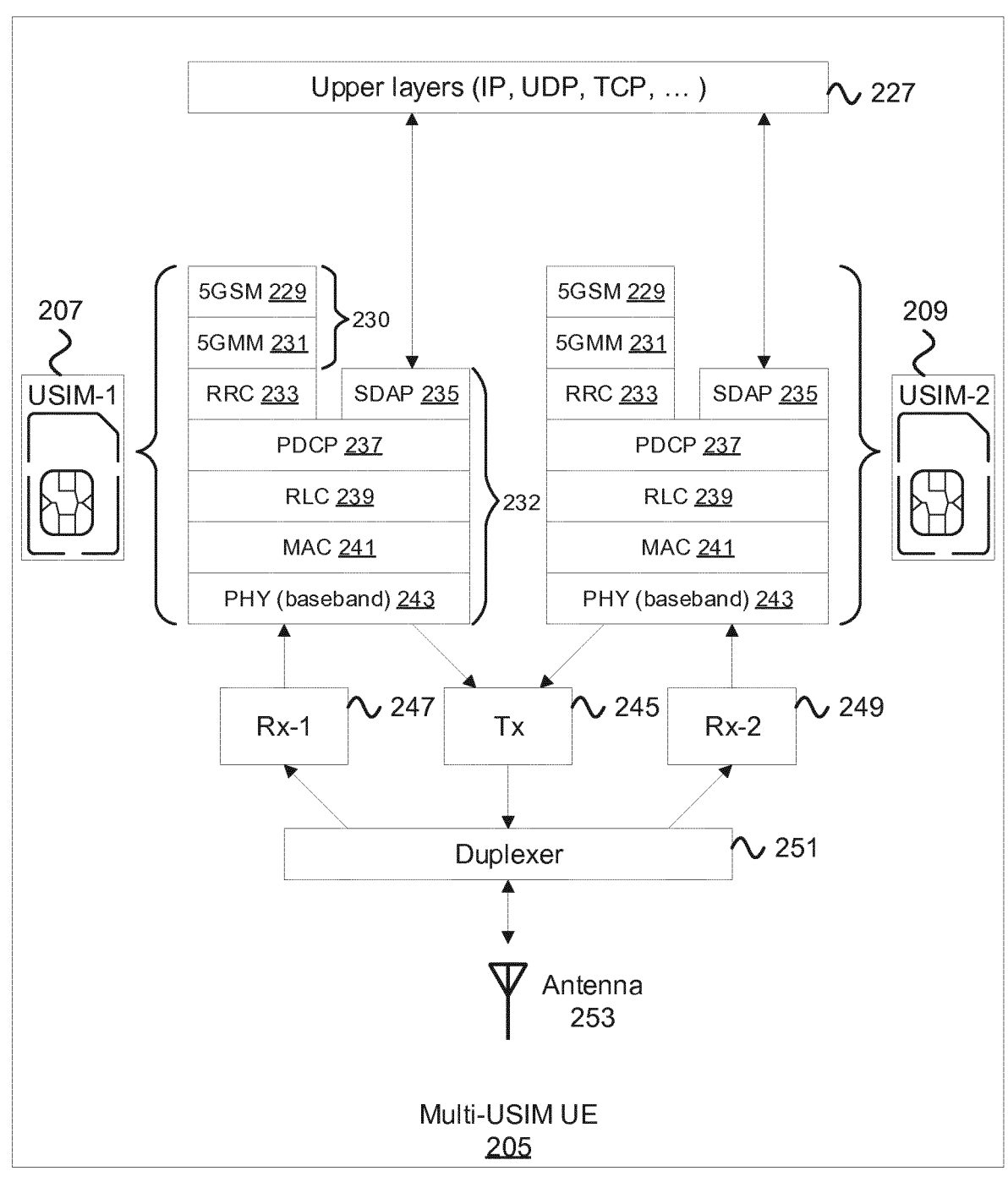
FIG. 2B is a block diagram illustrating one embodiment of a protocol stack of a multi-USIM UE.

FIG. 2B depicts a protocol stack 225 of the multi-USIM UE 205. The protocol stack 225 includes the upper layers 227 (e.g., IP layer, transport (UDP, TCP) layer(s), etc.). The protocol stack 225 includes the 5GS Session Management ("SGSM") sublayer 229 and the 5GS Mobility Management ("SGMM") sublayer 231, which comprise the NAS layer 230. Note that the AMF 143 includes a NAS layer may establish a NAS signaling connection with the multi-USIM UE 205. The AS layer 232 (also referred to as the "Radio Protocol" of the protocol stack 225 includes the RRC layer 233, the Service Data Adaptation Protocol ("SDAP") layer 235, the PCDP layer 237, the RLC layer 239, the MAC layer 241, and the PHY layer 243 (baseband). The RAN node (e.g., base unit 121) includes corresponding AS layers and may establish an AS signaling connection with the multi-USIM UE 205.

Note that the multi-USIM UE 205 (e.g. the ME 210 part of the multi-USIM UE 205), needs to implement at least as many NAS protocol stacks and radio protocol stacks (e.g. abbreviated as NAS/RP stack) as the number of USIMs which can be simultaneously registered with the same or different PLMN. In FIG. 2B, there are two NAS/RP stacks and 2 USIM cards/profiles. Note that each NAS/RP stack has its own receiver (e.g., a first receiver ("Rx-1") 247 for the USIM-1 207 and a second receiver ("Rx-2") 249 for the USIM-2 209), but the multi-USIM UE 205 has a single transmitter 245. Transmitted and received signals are communicated via the duplexer 251 and antenna 253.

The different NAS/RP stacks serving the different USIMs need to have the ability to exchange the status of the other protocol stack. For example, if the protocol stack for USIM-1 207 wants to initiate transition from idle to connected state, the USIM-1's protocol stack queries the state of USIM-2 209. There can be various behavior scenarios.

For example, if the connection state of USIM-2 209 is connected (e.g. ECM/CM Connected state on 5GMM NAS level 231) and if the USIM-2 209 applications are configured with higher priority (or the user decides to keep the communication via USIM-2 209 and ignore the communication trigger for USIM-1 207), then the USIM-1's protocol stack does not initiate actions to activate the connection, i.e. the USIM-1's protocol stack remains in idle state and indicates to the application that the connection establishment is currently not possible. For example, the multi-USIM UE 205 may display a prompt to the user asking whether to interrupt (e.g., temporarily suspend) an active service or application of USIM-2 209 in order to accept a new connection (e.g., service/application) for USIM-1 207. Further, the user may be prompted whether the USIM-1 service/application should always be able to interrupt the USIM-2 service/application. This user-designated priority in other configurations may be stored in the multi-USIM UE 205, e.g., allowing automatic suspension of services/applications.

In another example, if the connection state of USIM-2 209 is connected (e.g. ECM/CM Connected state on 5GMM NAS level 231) and if USIM-2 209 applications are configured with lower priority (or the user decides to keep the communication via USIM-2 209 and ignore the communication trigger for USIM-1 207), then the USIM-1's protocol stack may request the USIM-2's protocol stack to suspend the ongoing connection. After the connection with USIM-2 209 is suspended, the USIM-2's protocol stack indicates (e.g. using internal means in the remote unit) to the USIM-1's protocol stack the suspended connection, so that the USIM-1's protocol stack can initiate connection establishment. Note that if the USIM-2's connection state is idle (e.g. ECM/CM Idle state on 5GMM NAS level), then inter-SIM priority is not relevant as the USIM-1's protocol stack can proceed with the connection establishment.

As discussed above, a UE supporting multiple SIMs can operate in Passive mode, DSDS mode, or DSDA mode. Passive mode is just a UE using a single USIM at any point, i.e. there are never more than a single USIM registered with a network. Therefore, a UE in Passive mode is not considered a multi-USIM UE 205 from 3GPP perspective. Further, DSDA mode is where each USIM would have a dedicated ME 210 (e.g. transceiver or modem) per USIM. Therefore, a UE in DSDA mode does not fall in the scope of the multi-USIM UE 205 according to this disclosure.

Consequently, the multi-USIM UE 205 operates in DSDS mode. Two DSDS sub-mode are introduced herein: in Multi USIM Single Active ("MUSA") mode the operating mode of a multi-USIM UE 205 in which at most one USIM can be used for connected mode at any given time; in Multi USIM Multi Active ("MUMA") mode the operating mode of a multi-USIM UE 205 in which a subset of the multiple USIMs (e.g., M USIMs) can be used for connected mode (N connected modes) at any given the same time. The relation between M and N is M>N.

In contrast to conventional UEs (e.g., UE 200), the multi-SIM UE 205 supports at least two different levels of connection suspension states. One possible criterion to differentiate between the suspension states can be the time duration of the suspension. For example, depending on the (estimated) time duration of the multi-SIM UE 205 being active in the target system (e.g. with USIM-1 207), the other system (USIM-2 209) can suspend the current active connection for short time (e.g. short suspended state, done at RRC layer 233) or long time (e.g., long suspended state, done at NAS level). In contrast, legacy UEs support only a single suspended state (e.g., at the NAS level).

The multi-SIM UE 205 determines which type of suspended connection to use when suspending connection for one USIM (e.g. for USIM-1 207) in order to establish connection to USIM-2 209. In various embodiments, there are at least two types of suspended connection: a) long suspended connection where NAS protocol exchange between the multi-SIM UE 205 and CN 140 is used to suspend the active connection; or b) short suspended connection where the AS context is kept in the multi-SIM UE 205 and RAN Node, while radio transmission is deprecated. One example of the long suspended connection is described in International Patent Application PCT/EP2017/076410, published as WO 2019/076439, which is incorporated herein by reference.

Regarding characteristics of the short suspended connection state, the serving RAN node keeps the UE AS context (security context, bearer context, etc.) and the multi-SIM UE 205 keeps its AS context. In various embodiments, the state of the multi-SIM UE 205 can be 1) RRC Connected or 2) RRC Inactive, but importantly with disabled transmission (i.e. disabled DL transmission from RAN point of view, or disabled UL transmission from UE point of view). The short suspended connection state can be entered even if there is ongoing communication and/or buffered packets for transmission at the e.g. PDCP layer. In such case, the transmission can be outstanding PDCP packets can be interrupted and packets can be buffered for the duration of the short suspended connection state. The short suspended connection state can be entered upon explicit signaling requested by the multi-SIM UE 205. In some embodiments, when implementing the short connection suspension for the USIM-1 207, the multi-SIM UE 205 is in RRC Connected state and does not trigger radio link failure ("RLF") to upper layers (e.g. NAS, PDCP, SDAP).

In certain embodiments, the short suspended state is similar to the RRC_INACTIVE state as described in 3GPP TS 38.300 but among other differences without transmission availability. In the short suspended state, the RAN node knows that the multi-SIM UE 205 is unavailable for DL transmission. The RAN node is aware that the multi-SIM UE 205 is not able to transmit data/signaling, e.g. due to the active communication with other USIM. The RAN node does not perform RAN paging procedure and the RAN node does not assign RAN notification area (RNA). The RAN node may or may not notify the core network (e.g. AMF or SMF) about the activation of the short suspended state for a given UE. For example, the RAN node may not notify the core network due to one or more of the following reasons: 1) because the duration of the short suspended state does not impact e.g. the NAS timers running in the AMF or SMF for NAS messages retransmission, or 2) because there are no established DRBs with delay critical or high reliability QoS flows (e.g. for URLLC, or emergency or priority services). If the UE request short suspended state transition (e.g. by sending a RRC connection release request) and the RAN node rejects the transition to short suspended state, as follow-up action the UE may request the transition to long suspended state (e.g. by sending NAS MM request message)

to the core network (e.g. AMF or MME). The RAN node may notify the core network (e.g. AMF or SMF) about the short suspended state in case that the AMF has requested the explicit notification during the transition from Idle to Connected state (e.g. during UE Initial Context Setup procedure from AMF/MME to RAN node).

Alternatively, the short suspended state may be an RRC_INACTIVE state with disabled radio transmission. Here, if DL packets arrive at the RAN node, then the RAN node is to buffer them, e.g. in the PDCP layer. If the buffer is full, the RAN node drops the packets. With other words, the short suspended state can be described as similar to a radio link failure (RLF) condition, but instead of implicit detection of RLF by RAN node and multi-SIM UE 205, it is requested by explicit RRC signaling from the multi-SIM UE 205. From the UE point of view, the multi-SIM UE 205 also keeps the AS context (security context, DRBs context, etc.), but the multi-SIM UE 205 does not request resources for UL transmission when UL data arrives. The multi-SIM UE 205 may buffer the UL packets in e.g. PDCP layer and drop the packets if the buffer becomes full.

While the procedures of FIGS. 3, 4A-4B, and 5A-5B are described with the assumption of UEs operating in MUSA mode, note that the solutions can be also applied for UEs operating in MUMA mode.

Figure 3:
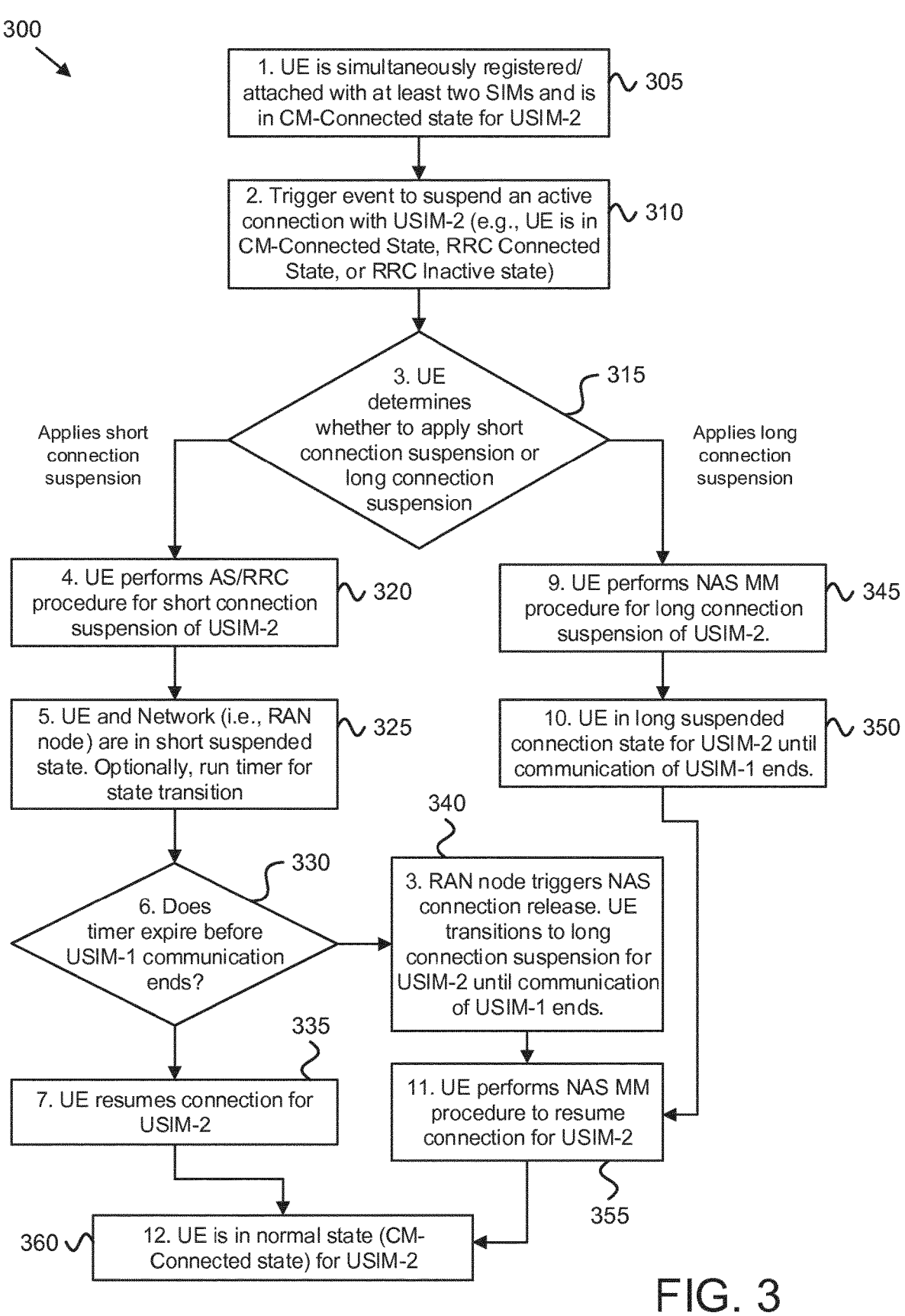
FIG. 3 is a flow diagram illustrating one embodiment of a procedure for suspending a connection of one SIM during multi-SIM operation.

FIG. 3 depicts a flowchart 300 describing behavior of a multi-SIM UE for suspending a connection of one SIM during multi-SIM operation, according to embodiments of the disclosure. In various embodiments, the procedure depicted in the flowchart 300 may be implemented by a multi-SIM remote unit 105 and/or the multi-USIM UE 205.

The procedure begins at Step 1 as the multi-SIM UE 205 registers/attaches with both USIM-1 207 and USIM-2 209 (see block 305). Further, the multi-SIM UE 205 enters a CM-Connected state for the USIM-2 209. In various embodiments, the multi-SIM UE 205 exchanges a supported M-USIM capability with the network. This may include indicating whether only a single suspended state (e.g. long suspended state at NAS) is supported or whether multiple suspended states are supported (e.g. long suspended state at NAS and short suspended state at AS). In various embodiments, the network (e.g., RAN Node or MME/AMF) can reply with configuration (or preference) which suspension mode to use (e.g. single suspension state, or multiple suspension states). If the network does not send M-USIM capability or M-USIM preference, the UE may conclude that the network does not support M-USIM capability and the UE would initiate any of the procedures for long suspended state (e.g. at NAS) or short suspended state (at RRC). The flowchart 300 assumes that multiple suspension states are supported at the multi-SIM UE 205 and the network.

At step 2, the multi-SIM UE 205 detects a trigger event to suspend an active connection with the USIM-2 209 (see block 310). Recall that a service or application of the USIM-1 207 can trigger suspension if the trigger event is for higher priority service than an application or service corresponding to the active connection of the USIM-2 209. Additionally, the multi-SIM UE 205 determines whether to apply a short connection suspension (i.e., enter the short suspended connection state) or to apply a long connection suspension (i.e., enter the long suspended connection state) (see block 315).

For example, if the multi-SIM UE 205 is paged for USIM-1 207 and if based on the paging cause value the multi-SIM UE 205 determines that the MT communication for USIM-1 207 would be short (e.g. less than 1-2 seconds), then the multi-SIM UE 205 may decide to enter short suspended connection state for USIM-2 209. Otherwise, if the paging cause value does not indicate a short MT communication, then the multi-SIM UE 205 may decide to enter the long suspended connection state for USIM-2 209. Otherwise, if the MT communication trigger event for USIM-1 207 indicates a service with lower priority than the ongoing service for USIM-2 209, the UE may decide to continue with the communication with USIM-2 209 and the UE does not respond to the paging for USIM-1 207.

During the step 3 of determining whether to apply short or long suspend state, the multi-SIM UE 205 can consider whether guaranteed bit rate (GBR) QoS flows or bearers are used for USIM-2 209 connection. One possible behavior can be, that if GBR flows are in place (or there are QoS flows requiring low latency and/or high-reliability, e.g. URLLC QoS flows), the multi-SIM UE 205 can determine to apply long suspended state (independent of the possible MT communication duration for USIM-1 207). If there are only non-GBR flows, then the multi-SIM UE 205 can determine to apply short or long suspended state based on the estimated duration for the type of service for USIM-1 207. Another possible behavior can be that if the active connection with USIM-2 209 corresponds to an emergency service or other (multimedia) priority service (MPS), then the USIM-1 207 is not permitted to interrupt (e.g., trigger suspension) the USIM-2 209.

In certain embodiments where the timer value for the short suspended state is known at the point of step 3 (e.g. the timer value is broadcasted in system information broadcast or received during the registration/attach procedure), the value of the timer may affect whether the UE decides to enter short suspended state or long suspended state. For example, if the timer value is 1 second and trigger event for USIM-1 207 in step 2 is SMS service, the UE may decide to enter long suspended state because the UE may assume that concatenated SMS transmission may take longer than 1 second. However, if the trigger event for USIM-1 207 in step 2 is tracking area update or registration (including both periodic and mobility-triggered update) procedure, the UE may decide to enter short suspended state because the UE may assume that such signaling procedures may take shorter than 1 second.

At step 4, it is assumed that short connection suspension is selected, therefore the multi-SIM UE 205 performs AS/RRC procedure for short connection suspension of USIM-2 209 (see block 320). Such an AS/RRC procedure is described in further detail with reference to FIG. 4A.

After MT communication with USIM-2 209 is over, the UE indicates to the PLMN2 release assistance indication (RAI) in order to return to USIM-1 207 network ASAP. The RAI allows for quicker transition to IDLE state of USIM-2 209. The exchange between the USIM-1 207's protocol stack and USIM-2 209's protocol stacks is as described in Fehler! Verweisquelle konnte nicht gefunden werden.

The UE performs RRC connection modification for USIM-1 207 (i.e. PLMN1) in order to resume the suspended connection (e.g. re-activate the radio transmission). After the UE resumes the radio connection, e.g. after UE performs the step (7), the RAN node attempts to transmits any buffered DL packets. Any lost packets can be recovered by application layer transmission. Similarly, the multi-SIM UE 205 may buffer the UL packets in e.g. PDCP layer and after the radio connection is resumed, e.g. after UE performs the step (7), the UE attempts to transmit the buffered UL packets.

At step 5, the UE and network (e.g., RAN Node) are in the short suspended state where the AS context is preserved (see block 325). Additionally, there may be a timer running for state transition. Such a timer value can be negotiated during step 4 during the procedure for entering a short suspended state procedure (e.g. the network/RAN node may send the timer to the multi-SIM UE 205 in a reply message).

For example, a timer value for a short suspended state can be 3 seconds. The timer starts running in the multi-SIM UE 205 and in the RAN node upon entering the short suspend state. If the timer expires, the network (e.g. RAN node) and multi-SIM UE 205 may transit to long suspended state. On the UE side, if the timer expires before the USIM-1 207 communication ends (see block 330), then the multi-SIM UE 205 can transit to long suspended state (see block 340). In certain embodiments, this transition is done implicitly at the multi-SIM UE 205 (i.e. without signaling to the network) by deleting the AS context and indicating to the NAS layer to suspend the connection (long suspension). On the network side, the RAN node may perform UE AS context release and access network (AN) connection release procedure (e.g. TS23.502 clause 4.2.6).

If the USIM-1 207 communication ends before the timer expires, the multi-SIM UE 205 transitions out of the short connection suspension and resumes connection for the USIM-2 209 (see block 335). Resuming connection is discussed in further detail below with reference to FIGS. 4B and 5A-5B. After resuming connection, the multi-SIM UE 205 is in a normal state (e.g., CM-Connected state) for the USIM-2 209 (see block 360).

If the multi-SIM UE 205 selects the long connection suspension, then at step 9 the UE performs NAS MM procedure for long suspension of the USIM-2 209 (see block 345). As discussed herein, the long suspension connection involves deleting the AS context at the UE and the RAN node. At step 10, the multi-SIM UE 205 remains in the long connection suspended state for USIM-2 209 until the communication of USIM-1 207 ends (see block 350).

At step 11, the multi-SIM UE 205 performs NAS MM procedure to resume connection of USIM-2 at the conclusion of the communication of USIM-1 207 (see block 355). Resuming connection is discussed in further detail below with reference to FIGS. 4B and 5A-5B. At step 12, after resuming connection, the multi-SIM UE 205 is in a normal state (e.g., CM-Connected state) for the USIM-2 209 (see block 360).

While FIG. 3 shows the example of two different suspended states (e.g. short suspended state and long suspended state), the present disclosure is not limited to two states. In general, it is possible to have multiple suspend states with means for transition among the state, e.g. short suspended state, middle suspended state, and long suspended state.

Figure 4A:
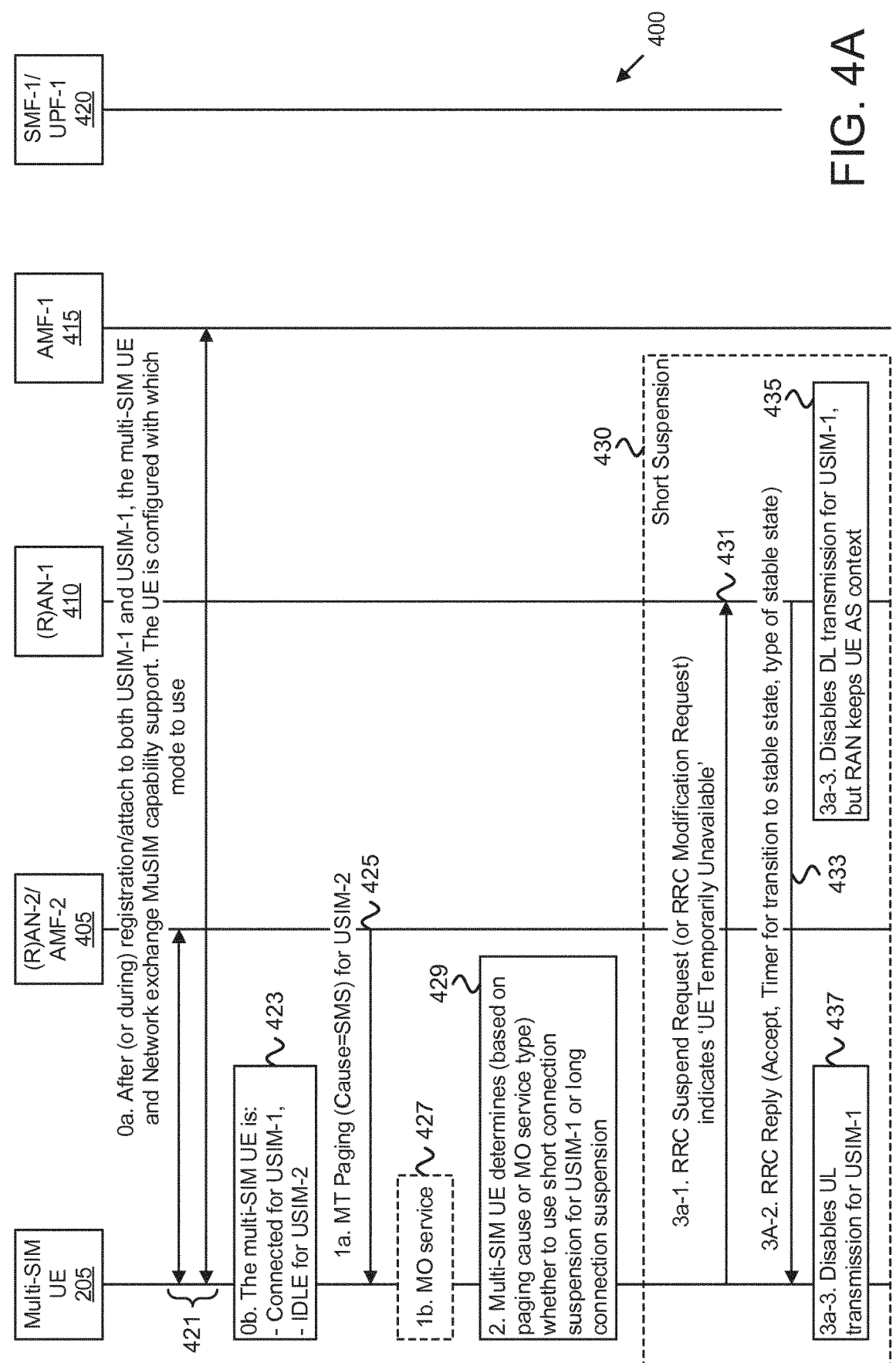
FIG. 4A is a signal flow diagram illustrating one embodiment of suspending a connection of one SIM during multi-SIM operation.
Figure 4B:
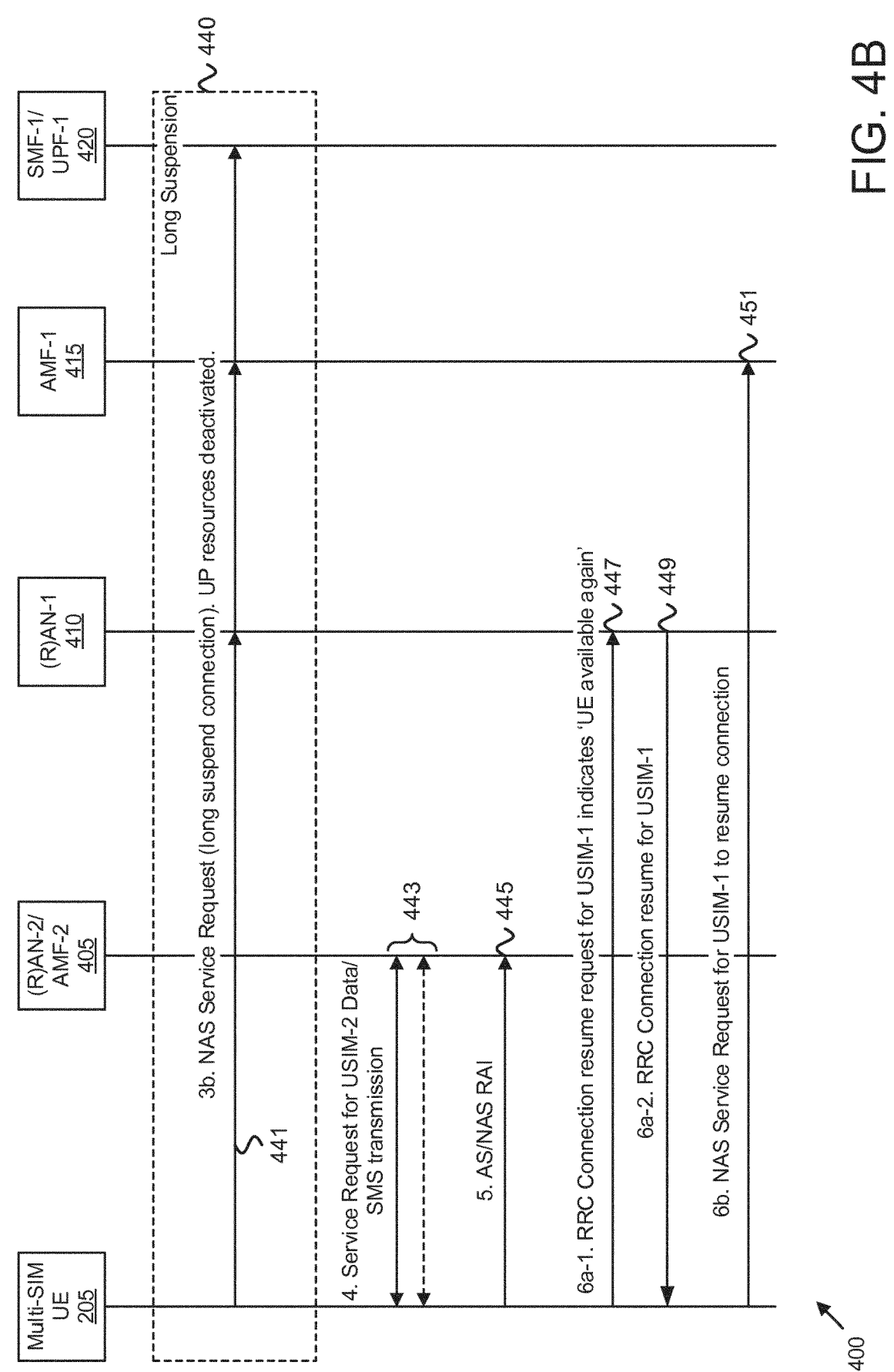
FIG. 4B is a continuation of the procedure depicted in FIG. 4A.

FIGS. 4A-4B depict a procedure 400 for the scenario of suspended connection for one USIM (e.g. for USIM-1), according to embodiments of the disclosure. The procedure 400, introduces AS protocols (e.g., RRC procedure) to implement the signaling for radio transmission suspension. The procedure 400 involves the UE 205, the (R)AN-2/AMF-2 entity 405, the (R)AN-1 node 410, the AMF-1 415, and the SMF-1/UPF-1 entity 420. While the (R)AN-2/AMF-2 405 is depicted as a combined entity, in various embodiments the AMF-2 is not co-located with the (R)AN-2. The (R)AN-2/AMF-2 405 is part of PLMN2 where the USIM-2 is registered, whereas the entities (R)AN-1 node 410, the AMF-1 415, and the SMF-1/UPF-1 420 are part of PLMN1 to which USIM-1 is registered. Similarly, while the SMF-1/UPF-1 420 is depicted as a combined entity, in various embodiments the SMF-1 is not co-located with the UPF-1.

At FIG. 4A, the procedure 400 begins at step 0 as the UE 205 registers (or attaches) to one or more mobile communication networks using multiple SIMs (e.g., USIM-1 and USIM-2, see signaling 421). Upon registration with more than one USIMs (e.g., where the UE 205 is already registered with USIM-1 and initiates registration with USIM-2), the UE 205 performs NAS MM procedure (e.g. Registration request or TAU procedure) to indicate its multiple-SIM ("MuSIM") capabilities to each network (i.e. for each activated USIM). This can be e.g. indicated in NAS MM messages to network serving node (e.g. AMF/MME). The MuSIM UE capability may include: 1) MuSIM support: (e.g., yes/no), 2) support of suspended states: (e.g., long suspend state, and/or short suspend state, etc.), and/or 3) support of Release Assistance Information ("RAI") for CP transmissions, SMS transmissions, and/or UP transmissions. This support of RAI may be helpful in determining in the network (e.g. in the RAN node or in the AMF) to quickly terminate the control plane transmission. For example, a RAN node will generally have a so-called "inactivity timer" with a value (e.g., 10 seconds) which is triggered by UL/DL data. So, if the inactivity timer for a UE expires because data is not sent or received over a radio bearer (e.g., signaling bearer and/or data bearer), then the RAN node can put the inactive UE into Idle state. An Access Stratum RAI ("AS-RAI") indication from the UE lets the RAN node know that it can immediately put the UE in Idle state (e.g., at RRC layer) instead of waiting for the inactivity timer to expire. Similarly, a Non-Access Stratum RAI ("NAS_RAI") indication from the UE lets the AMF know that it can immediately put the UE in Idle state (e.g., at NAS layer) instead of waiting for an inactivity timer to expire.

Note that in one embodiment, the UE 205 sends the MuSIM information only when the second USIM is activated (which may be a manual activity). Please note that in the above description the MuSIM UE capability indication in the NAS MM request message implies both a) the UE 205 supports the mechanism for MuSIM as described in FIG. 3 and b) the UE 205 would like to use (i.e. requests) the MuSIM mechanism due to multiple USIMs activated in the UE 205 (i.e. the UE 205 registers with multiple USIMs). With other words, the UE 205 may determine to send the MuSIM UE capability indication in the NAS MM request message if the UE205 registers to use multiple USIMs. In an alternative approach, the UE 205 may also send two distinct indications to the network, the one about the MuSIM UE capability and another one about MuSIM required. In one example, the latter indication (MuSIM required) would mean to the network that the network should reconfigure internally to start sending service/traffic type indication in the paging message for this UE 205. Note that the from the network perspective, the MuSIM feature/enhancements support means that the network supports at least the means to 1) send service/traffic type indication in the paging message and/or 2) transition to long suspended state and/or short suspended state.

The network function (e.g. AMF or MME) may indicate the preferred (or supported) mode of operation in the NAS MM response message (e.g. Registration Accept or Attach Accept message) similarly to the UE indications. The network (e.g. AMF or MME) may decide to send indication about the preferred MuSIM mode if A) the UE 205 has indicated the MuSIM support capability in the NAS MM request message and B) upon network policy/configuration and type of subscription associated with the UE 205. If the UE 205 has previously indicated MuSIM support capability and the network has enabled/applied the MuSIM enhancements to the UE's registration, but in consecutive NAS MM procedure the UE 205 does not include MuSIM support capability, or the UE 205 includes an explicit indication about no more MuSIM support required, this would mean that the UE 205 may have deactivated the one USIM card and from now on the UE 205 operates in single USIM mode. In such case, the network (e.g. AMF or MME) may delete the previously stored MuSIM support from the UE context, and the network does not include the MuSIM preference in the NAS MM response message. The network can delete the stored MuSIM support capability in the UE's context stored in AMF/MME upon Deregistration or Detach procedure.

The network (e.g. AMF or MME), may send in the NAS MM response (e.g. registration accept message) a network indication to the UE which for example may include: 1) MuSIM preference/support: (e.g., yes/no), 2) preference/support of suspended states: (e.g., long suspend state, and/or short suspend state, and/or preferred duration of short suspended state, etc.), and/or 3) support of Release Assistance Information ("RAI") for CP transmissions, SMS transmissions, and/or UP transmissions. If the network does not send MuSIM preference or MuSIM support indication to the UE 205 (e.g. the indication included in the reply message to the NAS MM procedure requested by the UE), the UE 205 concludes that the network does not prefer or support MuSIM feature/enhancements and the UE determines to not apply the MuSIM feature/enhancements (i.e. the UE would not initiate any of the procedures for long suspended state or short suspended state). In this sense, while using the current registration with this PLMN, the network (e.g. AMF or MME) is able to determine appropriate configuration the UE whether to apply or not the mechanisms for MuSIM feature/ enhancements and/or the long or short suspended connection state and/or other parameters required for the MuSIM enhancements (e.g. time for short suspension connection state).

It is possible that the one network (e.g. PLMN-1 including (R)AN-1 node 410, the AMF-1415, and the SMF-1/UPF-1) serving USIM-1 supports MuSIM capability or wants to apply MuSIM feature, whereas the other network (e.g. PLMN-2 including (R)AN-2/AMF-2 405) serving USIM-2 does not support MuSIM capability (or does not want to apply the MuSIM feature). In such case, the UE 205 may apply the solution for connection suspension and resumption towards PLMN-1 as described in FIG. 3 and below in step 3 and 6, but the UE 205 would trigger the procedures for connection suspension and resumption for MO services. The UE 205 is aware that triggers for MT service would not contain service/traffic type in the MT request (e.g. paging) message. Please also note the network may decide to apply the MuSIM feature/enhancements based on network operator policy or configuration. For example, the network can decide to enable/apply the MuSIM enhancements for non-roaming UEs, but not enable/apply the MuSIM enhancements to roaming UEs. In another example, the network may decide to apply the MuSIM enhancements to high-profile subscribers (e.g. gold or silver members), but not apply the MuSIM enhancements to low-profile subscribers (e.g. bronze members or pre-paid subscribers). It is advantageous if both networks PLMN1 and PLMN-2 apply the MuSIM enhancements to have all benefits of this solution, but it is still possible to have certain/partial advantages if only one of the multiple networks apply MuSIM enhancements.

The network (e.g. AMF or MME) may send a configuration indication to the RAN node (e.g. gNB or eNB) during the UE initial context setup procedure or UE context modification procedure, whether the short suspended state is allowed for this UE. This indication would help the RAN node to determine whether to apply the short suspended state if the UE sends such a request as per step 3*a*-1 (see signaling 431). For example, if the AMF/MME does not include the indication that short suspended state is allowed (or supported), the RAN node should reject the UE's request to transition to short suspended state as per step 3*a*-1. The procedure 400 assumes that (after registration/attachment) the UE 205 is in a connected state (e.g., CM-Connected state) for USIM-1 and in an idle state (e.g., ECM/CM-Idle state) for USIM-2 (see block 423). At step 1*a*, the UE 205 receives core network (CN) initiated Paging message for USIM-2 209 (see signaling 425), where the Paging message can include additional paging information indicating service (or traffic) type which causes the MT communication, i.e. paging procedure. The granularity of the paging information can discriminate between the following service categories: a) IMS and non-IMS based Voice/video service; b) IMS and non-IMS based SMS or USSD; c) IMS service other than voice/video or SMS; and/or d) Other service not listed above, e.g. data services including video.

At step 1*b*, alternatively the trigger for USIM-2 209 communication can be mobile originated (MO) communication (see block 427). The upper layers in the UE 205 need to indicate additional information about the service/traffic type to the NAS layer, so that the NAS layer can take decision about service priority and service duration. In the current state of the art, the NAS layer may only know which PDU Session (e.g. IMS PDU Session) is to be activated, but whether the service over IMS is voice, video or SMS may not be visible to NAS layer. Thus, UE enhancement is needed to indicate service/traffic type to the NAS layer similar to the additional paging information for MT communication in step 1*a*.

At step 2, based on the service type in the paging cause in step 1a—or based on the type of MO communication in step 1b—and based on the supported or preferred capabilities from step 0, the UE 205 determines whether to apply short suspended connection or long suspended connection (see block 429). Refer to FIG. 3 for discussion of how the UE 205 determines which type of suspended connection to apply.

At step 3, the UE 205 applies mechanism for connection suspension to USIM-1. For example, steps 3*a* show UE procedure to apply the short suspended connection (also referred to as "short connection suspension", see group 430) while step 3*b* shows UE procedure to apply the long suspended connection (also referred to as "long connection suspension", see group 440).

At step 3*a*-1, if the UE 205 determines to apply short suspended connection, then the UE 205 performs RRC procedure to request to enter short suspend connection state or to release RRC connection with a specific indication to request the short suspended connection state, e.g. 'unavailability indication' (see signaling 431). Please note that 'unavailability indication' may be used to distinct this RRC request is for a new short suspended connection state from the known suspended connection as used for the cellular IoT enhancements in 4G and 5G. In some embodiments, the UE 205 may send a dedicated RRC message, e.g. RRC Suspend Request message or RRC connection release request message, to request the network (e.g. RAN node) to suspend the RRC connection and transit to short suspended connection state. In other embodiments an existing RRC message can be used and the UE includes a specific indication (e.g. a new informational element, IE), such as 'no transmission' or 'temporary unavailable' or 'connection release due to activity for other USIM', or some similar indication. In the UE, it is a new trigger to send the request for RRC connection release/suspend, i.e. the trigger is due to a need to establish a connection for another USIM, is different from other known triggers in the UE for connection release (i.e. due to power consumption reduction or UE radio capability change). This designates to the network side that the PDCP layer in the (R)AN-1 node 410 is to stop sending DL PDUs and to buffer upper layers PDUs. Please see detailed description of the short suspended connection state in the description of FIG. 3.

At step 3*a*-2, the (R)AN-1 node 410 replies with an RRC Suspend Response message which may indicate positive response or negative response (see signaling 433). For example, in step 3*a*-2 the existing RRC message RRCConnectionRelease message can be used with short connection suspension indication (the indication should teach the UE about the type of short connection suspended state). In various embodiments, the RRC Suspend Response message includes at least one of the following indications: 1) a timer value for transition to stable suspend state; and/or 2) a type of stable state. Examples of the stable state may include the long suspended connection, the RRC-Inactive state, and/or the ECM/CM-Idle state. Note that the short suspended connection state (e.g., 'temporary unavailable') is considered an "unstable" state as the UE 205 is considered available to the NAS layer, but unavailable to the RRC/AS layer. If the RRC Suspend Response indicates rejection for the short suspended state (i.e. negative response), the UE may determine to initiate a procedure for long suspended state as per step 3*b* (see signaling 440).

At steps 3*a*-3, the (R)AN-1 node 410 keeps the UE context (security, bearer context, N2 and N3 connections), however the (R)AN-1 node 410 stops DL transmissions (e.g. disables sending DL PDUs and instead buffers DL PDUs, e.g., in the PDCP layer, see block 435). Such state can be also described as RRC INACTIVE state with disabled radio transmission. Additionally, the UE 205 also keeps the UE context, but stops UL transmissions (e.g. disables sending UL PDUs and optionally buffers UL PDUs, e.g., in the PDCP layer, see block 437). In various embodiments, the short suspended is not applied if there are GBR bearers. In case of GBR flows/bearers, the UE 205 may determine to apply long suspended state.

Continuing at FIG. 4B, at step 3*b,* if the UE 205 determined to apply long suspended connection (e.g. based on the service type in the Paging message or MO service trigger), the UE 205 performs a NAS MM procedure (e.g. Service Request procedure) to inform the serving node (e.g. AMF-1 415) about the need to suspend the connection (see signaling 441).

At step 4, the UE 205 performs connection establishment towards USIM-2 (see signaling 443). For example, the UE 205 performs a Service Request procedure towards the network (e.g., (R)AN-2/AMF-2 405) to perform the control plane transmission or user plane connections activation (PDU Sessions or PDN connection activation).

At step 5, for the case of control plane transmission, the UE 205 may send Release Assistance Information ("RAI") for USIM-2, such as AS-RAI (e.g. to RAN-2) or NAS-RAI included in the NAS message (see signaling 445). The RAI indication may be determined in the UE 205 based on the knowledge that no more UL/DL data is expected in the UE 205. The RAI indication is beneficial in order to transfer to Idle state as soon as possible.

At step 6, the UE 205 resumes the connection to USIM-1. For example, in step 6*a*-1 where the short suspended connection was applied (and the timer has not expired), the UE 205 performs RRC connection resume procedure (see signaling 447). Here, the UE 205 can use the existing RRC message RRCConnectionResumeRequest message and optionally can include an indication that the UE 205 is available again, or can indicate whether UL data is outstanding and request UL resources. Alternatively, the UE 205 can use an RRC modification procedure, e.g. sending RRC Modification Request message to request for USIM-1 may include a parameter or indication that the UE 205 is available for transmissions again. Further in step 6*a*-2, the network (e.g. (R)AN-1 node 410) can reply with RRCConnectionResume message to activate the suspended SRBs and DRBs in the UE and RAN (see signaling 449). As another example, in step 6*b* where the long suspended connection was applied, the UE 205 performs NAS Service Request procedure for USIM-1 (see signaling 451).

After the connection to USIM-1 is suspended (e.g. after the UE enters CM-Idle state for USIM-1, i.e. after step 3*b* or after the timer in step 3*a*-2 expires), the NAS layer in the UE 205 may indicate 'interface down' to the applications which has been using the established data sessions (PDU sessions). This is beneficial in order to inform that the IP connectivity is no longer available. Once the connection is re-established again (e.g. after connection resume procedure in step 6), the NAS layer can inform the applications that the IP connectivity is available again.

As discussed above, the UE 205 is able to maintain a timer for short suspended state (as shown in steps 3*a*-2 and 3*a*-3). To configure the timer, one or more of following mechanism can be applied: 1) the RAN node sends the timer configuration via unicast message (e.g. RRC suspend accept/acknowledge message), 2) the timer configuration is broadcasted in the system information (e.g., SIB), and/or 3) the timer configuration is negotiated during NAS procedure (e.g. registration procedure or UE configuration update).

The known prior-art solution(s) for the connection suspension for one USIM (e.g. USIM-1) releasing the NAS signaling connection and then releasing the user plane resources result in additional signaling between RAN and CN for deleting the UE access stratum (AS) context in the RAN node and in the UE 205 and releasing the N2 and N3 associations. The legacy procedure also causes increased signaling when the UE 205 resumes the connection for the USIM-1, as the Service Request procedure with UP activation is performed. However, by introducing the "short suspended connection" state (or RRC_Inactive with disabled radio transmission) there is greater flexibility to suspend the radio transmission for short time at the AS layer (by using merely AS signaling, such as RRC suspend) without requiring the additional signaling at the NAS layer.

Figure 5A:
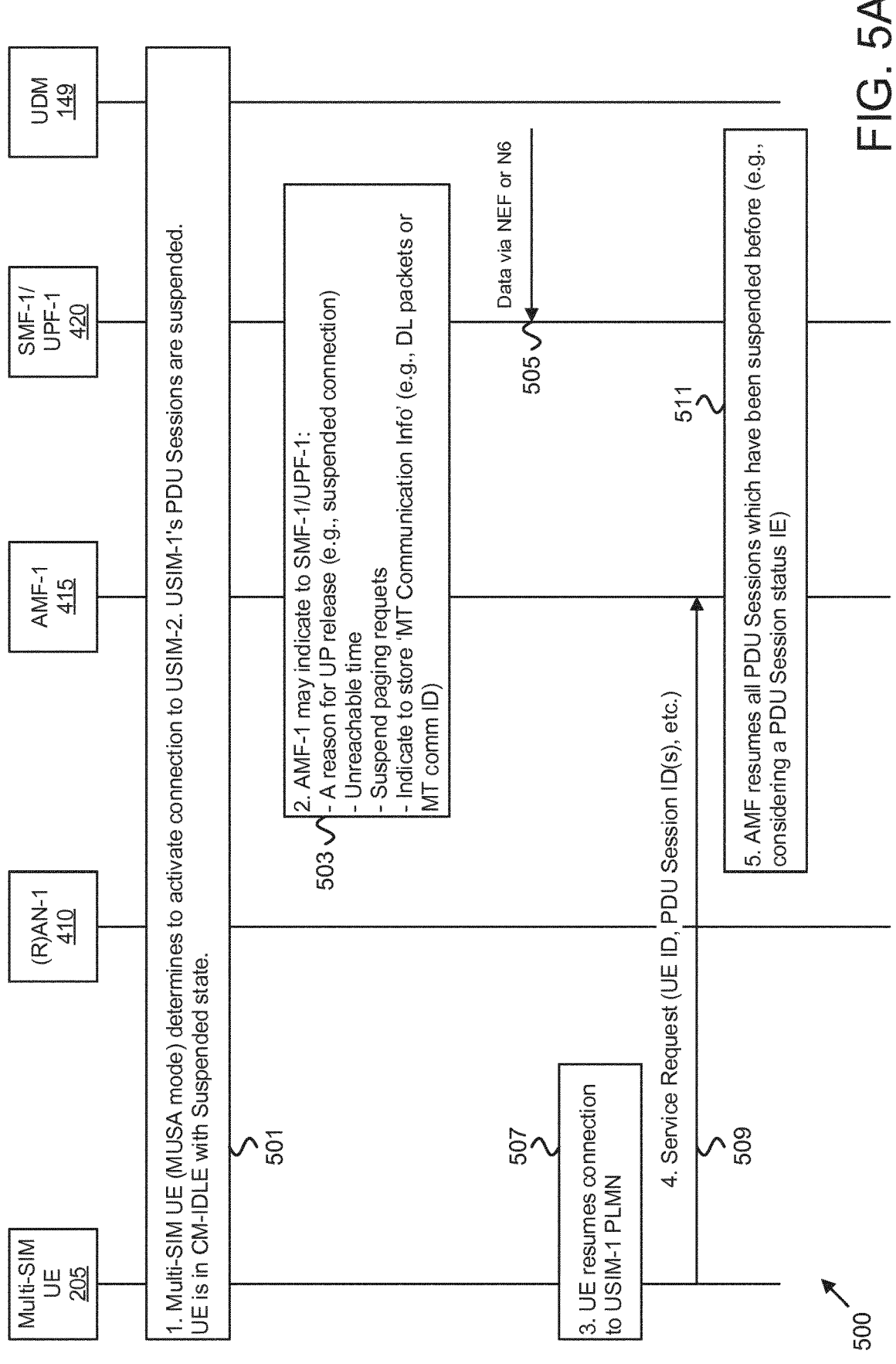
FIG. 5A is a signal flow diagram illustrating one embodiment of resuming a connection of one SIM during multi-SIM operation.
Figure 5B:
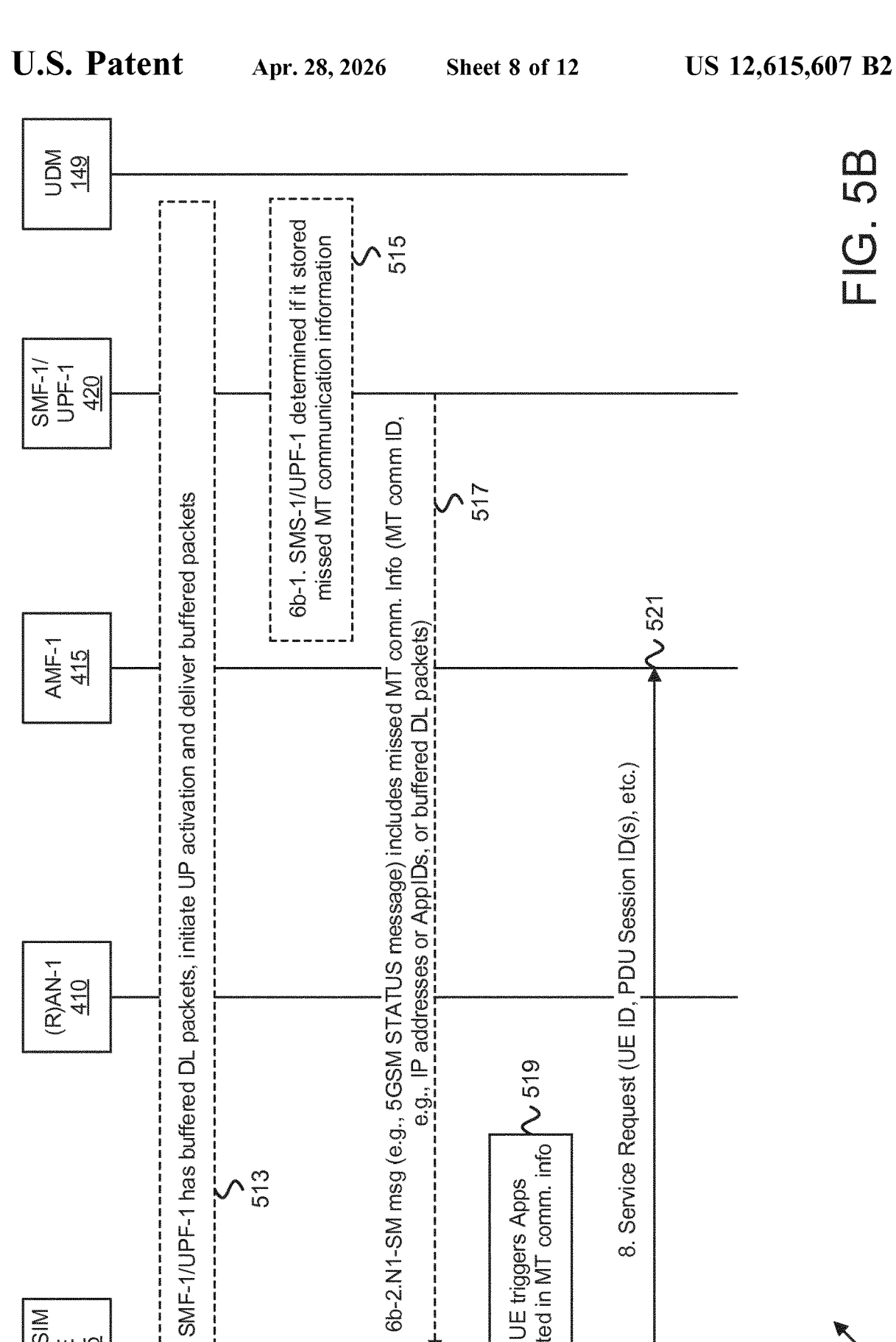
FIG. 5B is a continuation of the procedure depicted in FIG. 5A.

FIGS. 5A-5B depict a procedure 500 for how missed mobile terminated (MT) communication information can be generated during the suspend connection and can be sent to the UE during connection resumption, according to embodiments of the disclosure. The procedure 500 involves the multi-SIM UE 205, the (R)AN-1 node 410, the AMF-1 415, the SMF-1/UPF-1 420, and the UDM 149. During the suspended connection (i.e. long suspended state described above), the core network 140 does not attempt to deliver DL data and MT signaling, i.e. the core network does not page the multi-SIM UE 205. However, legacy procedure leaves unclear what happens with the DL packets in the network during the suspended connection. The problem is that upon resumption of the suspended connection, the multi-SIM UE 205 is not aware whether it has missed any communication.

The procedure 500 show a solution for handling packets buffered during a suspended connection, e.g., by informing the UE about the activities missed while the connection was suspended. The procedure 500 assumes that the connection for USIM-1 207 is suspended while the multi-SIM UE 205 establishes connection to USIM-2 209. In certain embodiments, the network (e.g. SMF or UPF) may store either data packets or MT communication identifier ('MT comm ID') during the 'suspended connection' state. The generalized term 'missed MT comm info' is used.

If the UE has an active connection to USIM-2 209 (e.g. based on service prioritization internally in the UE), after the activity for USIM-2 209 is over, the UE triggers release of the connection to USIM-2 209 in order to allow the resumption request for the suspended connection for USIM-1 207. For example, this may be needed if the UE is in CM-Connected and RRC Inactive state for USIM-2 209, which is considered as active connection to USIM-2 209. Such functionality may be needed because the suspended connection for a USIM may never trigger paging procedure.

In some embodiments, after UE performs NAS MM signaling (e.g. NAS service request procedure for USIM-1 207 to exit the suspended state), the network sends the stored 'missed MT comm info' to the UE. The 'missed MT comm info' can be sent to the UE via control plane signaling, e.g. using NAS session management signaling (e.g. NAS N1-SM signaling) from SMF to UE. As discussed in International Patent Application PCT/EP2017/076410, a UE can use NAS Service Request procedure and include 'MU Session status' indication to indicate which PDU Sessions are still valid for the suspended connection. In certain embodiments, the UE's SGSM layer 229 may internally process the information and forward to the information to the corresponding application(s). If needed, the application(s) may trigger the establishment of UP resources.

At FIG. 5A, the procedure 500 begins at step 1 as a multi-SIM UE 205 operating in MUSA mode determines to activate connection to USIM-2 209 (see block 501). The multi-SIM UE 205 may have exchanged MuSIM capabilities with the network during NAS MM procedure as described in FIG. 4A, step 0. As discussed above, the multi-SIM UE 205 determines to perform procedure to suspend USIM-1 207's connection (i.e. all established PDU Sessions). The UE transits to CM-Idle with Suspend state for USIM-1 207. In certain embodiments, the UE may use new parameters (or information elements, IEs) to inform the network for the reason for suspension and additionally for suspension duration.

At step 2, the network serving the USIM-1 207 (i.e. AMF-1, SMF-1, UPF-1, etc.) performs procedure(s) to suspend the existing connection (see block 503). Here, the AMF may indicate one or more of the following parameters to the SMF in the signaling for suspending of the PDU Session (please note that the AMF performs this step for each PDU Session which was active during the connection suspension): 1) the reason for PDU Session suspension or the reason for UP release (e.g. suspended connection); 2) unreachable time indicating the time for which the SMF should not attempts DL communication; 3) suspend paging requests: meaning that the SMF should not send paging request signaling if DL data 505 arrives; and/or 4) information whether the SMF should store downlink data activities during the suspended connection For example, the SMF may gather MT communication information (e.g. DL packets or stores MT communication ID, source address of the communication originator).

At step 3, the multi-SIM UE 205 determines to perform connection resumption for USIM-1 207 (see block 507). For example, the connection to USIM-2 209 has been released. At step 4, the multi-SIM UE 205 performs Service Request procedure (see signaling 509). There may be an explicit indication that this procedure is for resuming the old connection, i.e. the multi-SIM UE 205 is available again for DL communication.

At step 5, the AMF-1 415 resumes all PDU Sessions which have been suspended before (considering the PDU Session status IE, see block 511). At step 6, the network (e.g. SMF-1) may perform one of the following options:

Step 6*a*, if SMF-1/UPF-1 420 has buffered DL packets, the SMF-1 can activate use plane resources and deliver the buffered packets (see block 513). Please note that the buffered DL packets are transmitted via the user plane resources, i.e. N3 connection and DRB.

Step 6*b*, if SMF-1/UPF-1 420 has stored missed MT communication information, the SMF-1 sends N1-SM message (e.g. 5GSM STATUS message) including missed MT communication information (e.g. MT communication ID, e.g. IP addresses or Application originator ID, or buffered packets; see block 515 and signaling 517). Please note that the MT communication information may be transmitted via the control plane signaling connection.

At step 7, if the multi-SIM UE 205 receives MT communication information, the multi-SIM UE 205 triggers internally the applications identified by the MT communication information (see block 519).

At step 8, the multi-SIM UE 205 may perform the service request procedure to establish user plane resources for the PDU Sessions associated with the application(s) identified by the MT communication information in step 7 (see signaling 521).

The benefit of the solution of the procedure 500 is that the multi-SIM UE 205 is informed about the missed mobile terminating communication while the connection has been suspended. This solution can be used for applications (or PDU Sessions) which does not automatically contact the application servers if IP connectivity is available again (after being unavailable before).

In an alternative solution to the procedure 500, after a connection is resumed for a particular USIM, i.e. the USIM can use the radio transmission capabilities of the UE, the protocol stack associated with this USIM can indicate to the UE applications that IP connectivity is available again. Then, the UE applications can contact the corresponding application servers (ASs) and check whether there is any missed activity while the UE applications were not able to communicate due to the suspended connection.

Figure 6:
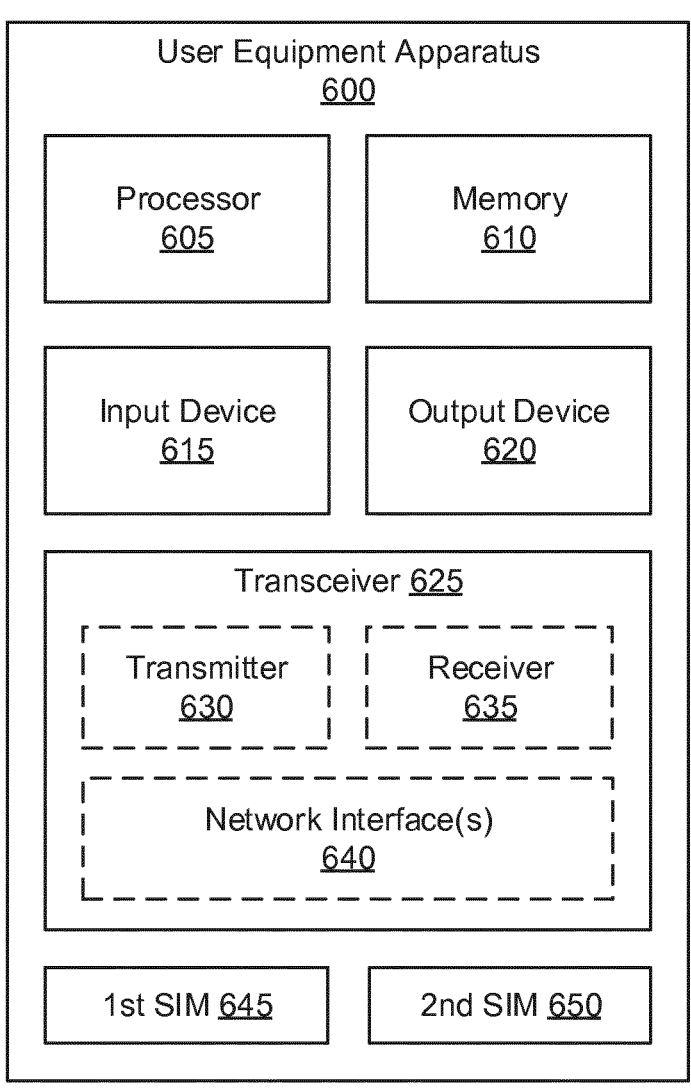
FIG. 6 is a block diagram illustrating one embodiment of a user equipment apparatus for suspending a connection of one SIM during multi-SIM operation.

FIG. 6 depicts one embodiment of a user equipment apparatus 600 that may be used for suspending a connection of one SIM during multi-SIM operation, according to embodiments of the disclosure. The user equipment apparatus 600 may be one embodiment of the remote unit 105. Furthermore, the user equipment apparatus 600 may include a processor 605, a memory 610, an input device 615, an output device 620, a transceiver 625. In some embodiments, the input device 615 and the output device 620 are combined into a single device, such as a touch screen. In certain embodiments, the user equipment apparatus 600 does not include any input device 615 and/or output device 620.

As depicted, the transceiver 625 includes at least one transmitter 630 and at least one receiver 635. Here, the transceiver 625 communicates with a mobile core network (e.g., a 5GC) via an interworking function (e.g., TNGF or N3IWF) and over a non-3GPP access network. Additionally, the transceiver 625 may support at least one network interface 640. Here, the at least one network interface 640 facilitates communication with an eNB or gNB (e.g., using the "Uu" interface). Additionally, the at least one network interface 640 may include an interface used for communications with an UPF, an SMF, and/or a P-CSCF.

The user equipment apparatus 600 includes a plurality of SIMs. In some embodiments, the user equipment apparatus 600 includes a first SIM 645 registered with a first mobile communication network and a second SIM 650 registered with a second mobile communication network.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 receives a communication trigger associated with the first SIM 645, the communication trigger indicating a service type. Here, the communication trigger is received while the second SIM 650 has an active connection (e.g., the user equipment apparatus 600 is in CM-Connected state for the second SIM 650). In one embodiment, the communication trigger is an indication of a mobile-terminated communication, such as a paging request. In another embodiment, the communication trigger is an indication of a mobile-originated ("MO") communication, such as an indication from an internal application of data to transmit.

In response to the communication trigger, the processor 605 determines whether to apply a short connection suspension for the second SIM or a long connection suspension for the second SIM, said determination based on the service type. For example, a MT paging message that indicates short-messaging service ("SMS") service type may trigger the short connection suspension. As another example, a MO Tracking Area Update ("TAU") message may trigger the short connection suspension.

In some embodiments, the communication trigger associated with the first SIM 645 is permitted to interrupt a service (or application) associated the second SIM 650 only if the triggered application or service type associated with the first SIM 645 is configured with higher priority than the application or service currently in use with the second SIM 650. In certain embodiments, the processor 605 determines not to suspend the connection for the second SIM 650 if the second SIM 650 is involved in emergency communication session (e.g., the first SIM 645 is not permitted to interrupt emergency communication services of the second SIM 650).

In some embodiments, the processor 605 also considers a bearer type associated with the second SIM 650 when determining whether to apply the short connection suspension or the long connection suspension for the second SIM. In such embodiments, the processor 605 may determine to apply the long connection suspension in response to the second SIM 650 being associated with a guaranteed bit rate ("GBR") bearer.

In some embodiments, the processor 605 controls the transceiver 625 to exchange a supported M-USIM capability with the network (e.g., with a RAN Node, AMF or MME). This may include indicating whether only a single suspended state (e.g., long suspended state at NAS) is supported or whether multiple suspended states are supported (e.g., long suspended state at NAS and short suspended state at AS). In various embodiments, the transceiver 625 receives a reply from the network (e.g., RAN Node or MME/AMF) containing a configuration (or preference) of which suspension mode to use (e.g., single suspension state, or multiple suspension states). If the network does not send M-USIM capability or M-USIM preference, the processor 605 may conclude that the network does not support M-USIM capability, as described above with reference to FIG. 3.

The processor 605 applies the selected one of the short connection suspension and the long connection suspension for the second SIM. In some embodiments, the processor 605 applies the short connection suspension for the second SIM 650 by transmitting an RRC layer suspension request and applies the long connection suspension for the second SIM 650 by transmitting an NAS layer suspension request. In certain embodiments, applying the long connection suspension for the second SIM 650 includes transitioning to an NAS idle state in response to reception of a suspension response message from the second network. Here, the suspension response message may be an RRC layer message or a NAS layer message. Note that the suspension response message is sent as response to the NAS layer suspension request message.

In certain embodiments, applying the short connection suspension includes the processor 605 disabling transmissions for the second SIM 650 in response to receiving an RRC layer suspension response. In certain embodiments, applying the short connection suspension includes the processor 605 maintaining an Access Stratum context for the second SIM 650.

In some embodiments, registering the first SIM 645 and the second SIM 650 includes indicating support for one or more of the following parameters: multi SIM enhancements, the short connection suspension, or long connection suspension, receiving a network preference indicating whether to apply multi SIM enhancements, or the short connection suspension, or long connection suspension, and configuring the processor whether to apply multi SIM enhancements, or the short connection suspension, or long connection suspension based on the received network preference. In certain embodiments, not receiving any network preference may be interpreted by the UE as an indication of non-support of multi SIM enhancements in the network (e.g., non-support is assumed unless a parameter indicating support is received).

In various embodiments, the processor 605 activates a connection associated with the first SIM 645 in response to suspending the active connection of the second SIM 650. While the active connection of the second SIM 650 is suspended, the processor 605 performs communication for the first SIM 645 corresponding to the communication trigger. Afterwards, the processor 605 controls the transceiver 625 to send release assistance information ("RAI") in response to ending the communication corresponding to the communication trigger, the release assistance information including Access Stratum ("AS") RAI and/or Non-Access Stratum ("NAS") RAI.

The processor 605 further resumes the suspended connection in the second communication network associated with the second SIM 650 in response to ending the communication corresponding to the communication trigger. In certain embodiments, resuming the suspended connection includes sending an RRC layer connection resume request in response to transmitting the RRC layer suspension request (e.g., to resume the short connection suspension of the second SIM 650) and/or sending a NAS layer resume request in response to transmitting the NAS layer suspension request (e.g., to resume the long connection suspension of the second SIM 650).

In some embodiments, the transceiver 625 receives a suspension timer value associated with the short connection suspension for the second SIM 650. For example, the transceiver 625 may receive a suspension response message that contains the suspension timer value. As another example, the suspension timer value may be broadcast in a System Information Block ("SIB") or negotiated during NAS registration procedure. In such embodiments, the processor 605 may initiate the suspension timer in response to receiving the RRC layer suspension response and transition from the short connection suspension to the long connection suspension for the second SIM 650 in response to expiry of the suspension timer.

In one embodiment, the user equipment apparatus 600 may initiate application/service level signaling before performing a connection suspension procedure (e.g. for long suspended state or for short suspended state). For example, the processor 605 may control the transceiver 625 to inform an application server (or other communication peer) about the temporary unavailability of the device (e.g., due to suspending one USIM in order to perform communications on the other USIM), so that the service or communication exchange can be interrupted (or paused or terminated) at the application/service layer in a controlled way. This is particularly beneficial in case of long suspended state when the user equipment apparatus 600 is not available for communication for some considerable time. Another benefit is that the communication peer would stop sending user data packets and user plane resources would not be consumed (e.g. buffering and dropping data packets). When the suspended USIM is restored/resumed, the processor 605 may control the transceiver 625 to inform the application server (or communication peer) that the user equipment apparatus 600 is again available for communication.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to suspending a connection of one SIM during multi-SIM operation, for example storing AS context, SIM states, and the like. In certain embodiments, the memory 610 also stores program code and related data, such as an operating system ("OS") or other controller algorithms operating on the user equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
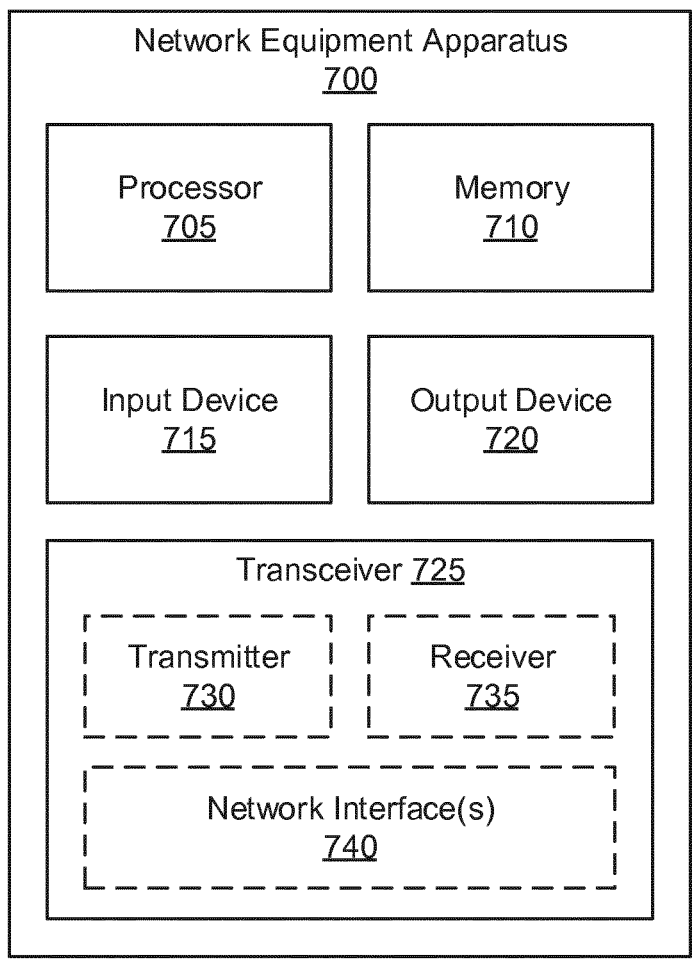
FIG. 7 is a block diagram illustrating one embodiment of a network equipment apparatus for suspending a connection of one SIM during multi-SIM operation.

FIG. 7 depicts one embodiment of a network equipment apparatus 700 that may be used for suspending a connection of one SIM during multi-SIM operation, according to embodiments of the disclosure. In some embodiments, the network equipment apparatus 700 may be one embodiment of a RAN node, such as the base unit 121 and/or the (R)AN-1 node 410. In other embodiments, the network equipment apparatus 700 may be one embodiment of the AMF 143, the AMF-1 415, and/or an MME. Furthermore, network equipment apparatus 700 may include a processor 705, a memory 710, an input device 715, an output device 720, a transceiver 725. In some embodiments, the input device 715 and the output device 720 are combined into a single device, such as a touch screen. In certain embodiments, the network equipment apparatus 700 does not include any input device 715 and/or output device 720.

As depicted, the transceiver 725 includes at least one transmitter 730 and at least one receiver 735. Here, the transceiver 725 communicates with one or more remote units 105 and with one or more interworking functions 135 that provide access to one or more PLMNs Additionally, the transceiver 725 may support at least one network interface 740. In some embodiments, the transceiver 725 supports a first interface (e.g., an N2 interface) that communicates with RAN node, for example a gNB or eNB, a second interface (e.g., an N8, N11, N15, etc. interfaces) which communicates with one or more control-plane network functions (e.g., UDM, SMF, PCF) in a mobile core network (e.g., a 5GC) and a third interface (e.g. N1 interface) that communicates with a remote unit (e.g., UE) over the first interface (N2 interface) via a 3GPP access network or via a non-3GPP access network.

The processor 705, in one embodiment, may include any known controller capable of executing computer-readable instructions and/or capable of performing logical operations. For example, the processor 705 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 705 executes instructions stored in the memory 710 to perform the methods and routines described herein. The processor 705 is communicatively coupled to the memory 710, the input device 715, the output device 720, and the first transceiver 725.

In various embodiments, the network equipment apparatus 700 may operate as a RAN node, for example a gNB or eNB. In such embodiments, the transceiver 725 receives an RRC layer suspension request from a remote unit (e.g., from a UE) and the processor 705 maintains a UE AS context for the remote unit. Additionally, the processor 705 may disable downlink transmissions to the remote unit in response to the RRC layer suspension request. In response to receiving an RRC layer connection resume request from the remote unit, the processor 705 enables downlink transmissions to the remote unit (UE).

In certain embodiments, the transceiver 725 transmits a suspension timer value associated with the short connection suspension for the second SIM and the processor 705 releases the UE AS context in response to expiry of the suspension timer. For example, the transceiver 625 may receive a suspension response message that contains the suspension timer value. As another example, the suspension timer value may be broadcast in a System Information Block ("SIB") or negotiated during NAS registration procedure. In such embodiments, the transceiver 725 may further indicate a type of suspend state to the remote unit, wherein the remote unit is to transition to the indicated suspend state in response to expiry of the suspension timer. Here, the type of suspend state may be communicated to the remote unit with the suspension timer value.

In some embodiments, the processor 705 buffers down-link packets for the remote unit in response to the RRC layer suspension request. Here, the transceiver 725 may attempt to deliver the buffered downlink packets in response to receiving the RRC layer connection resume request from the remote unit. In certain embodiments, the processor 705 suppresses a RAN paging procedure for the remote unit in response to receiving the RRC layer suspension request. In such embodiments, the processor 705 stops suppressing the RAN paging procedure for the remote unit in response to receiving the RRC layer connection resume request.

In some embodiments, the network equipment apparatus 700 may operate as a CN management function, such as the AMF 143, the AMF-1 415, and MME, etc. In such embodiments, the processor 705 may control the transceiver 725 to exchange a preferred (or supported) M-USIM capability with the UE. This may include receiving an indication whether the UE supports M-USIM feature/enhancements or whether only a single suspended state (e.g., long suspended state at NAS) or whether multiple suspended states are supported (e.g., long suspended state at NAS and short suspended state at AS). In various embodiments, the processor 705 controls the transceiver 725 sends a reply to the UE containing a configuration (or preference) of whether to apply the M-USIM feature/enhancements, or of which suspension mode to use (e.g., single suspension state, or multiple suspension states) or short suspension duration time (e.g. to be considered by the UE when determining whether to apply short or long connection suspended state). The processor 705 controls the transceiver 725 may also send an indication (or configuration) message to the RAN node, for example a gNB or eNB, whether the short suspended state is allowed for this UE.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media. In some embodiments, the memory 710 stores data relating to suspending a connection of one SIM during multi-SIM operation, for example storing UE AS context, UE states, and the like. In certain embodiments, the memory 710 also stores program code and related data, such as an operating system ("OS") or other controller algorithms operating on the network equipment apparatus 700 and one or more software applications.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touch-screen and/or by handwriting on the touchscreen. In some embodiments, the input device 715 includes two or more different devices, such as a keyboard and a touch panel.

The output device 720, in one embodiment, may include any known electronically controllable display or display device. The output device 720 may be designed to output visual, audible, and/or haptic signals. In some embodiments, the output device 720 includes an electronic display capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, all or portions of the output device 720 may be located near the input device 715.

As discussed above, the transceiver 725 may communicate with one or more remote units and/or with one or more interworking functions that provide access to one or more PLMNs. The transceiver 725 may also communicate with one or more network functions (e.g., in the mobile core network 140). The transceiver 725 operates under the control of the processor 705 to transmit messages, data, and other signals and also to receive messages, data, and other signals. For example, the processor 705 may selectively activate the transceiver (or portions thereof) at particular times in order to send and receive messages.

The transceiver 725 may include one or more transmitters 730 and one or more receivers 735. In certain embodiments, the one or more transmitters 730 and/or the one or more receivers 735 may share transceiver hardware and/or circuitry. For example, the one or more transmitters 730 and/or the one or more receivers 735 may share antenna(s), antenna tuner(s), amplifier(s), filter(s), oscillator(s), mixer(s), modulator/demodulator(s), power supply, and the like. In one embodiment, the transceiver 725 implements multiple logical transceivers using different communication protocols or protocol stacks, while using common physical hardware.

FIG. 8 depicts a method 800 for suspending a connection of one SIM during multi-SIM operation, according to embodiments of the disclosure. In some embodiments, the method 800 is performed by an apparatus, such as the remote unit 105, the multi-SIM UE 205, and/or the user equipment apparatus 600. In certain embodiments, the method 800 may be performed by a processor executing program code, for example, a microcontroller, a microprocessor, a CPU, a GPU, an auxiliary processing unit, a FPGA, or the like.

The method 800 begins and registers 805 a first SIM with a first mobile communication network. The method 800 includes registering 810 a second SIM with a second mobile communication network. The method 800 includes receiving 815 a communication trigger associated with the first SIM, the communication trigger indicating a service type. The method 800 includes determining 820 whether to apply a short connection suspension for the second SIM or a long connection suspension for the second SIM. Here, the determination is based on the service type. The method 800 includes applying 825 one of the short connection suspension and the long connection suspension for the second SIM. The method 800 ends.

Figure 9:
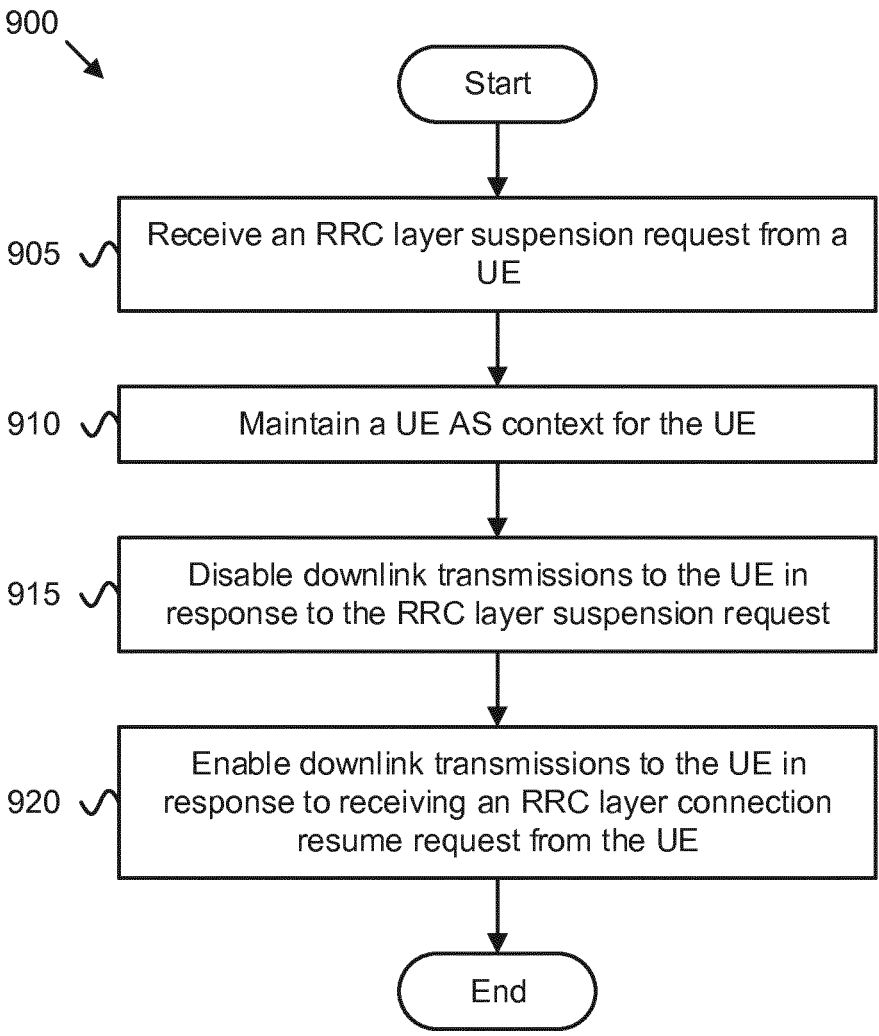
FIG. 9 is a flow chart diagram illustrating one embodiment of a second method for suspending a connection of one SIM during multi-SIM operation.

FIG. 9 depicts a method 900 for suspending a connection of one SIM during multi-SIM operation, according to embodiments of the disclosure. In some embodiments, the method 900 is performed by a network apparatus, such as the base unit 121, the (R)AN-1 node 410, the network equipment apparatus 700, a gNB, an eNB, and/or a RAN node. In certain embodiments, the method 900 may be performed by a processor executing program code, for example, a microcontroller, a microprocessor, a CPU, a GPU, an auxiliary processing unit, a FPGA, or the like.

The method 900 begins and receives 905 an RRC layer suspension request from a UE (e.g., a remote unit 105). The method 900 includes maintaining 910 a UE AS context for the UE. The method 900 includes disabling 915 downlink transmissions to the UE in response to the RRC layer suspension request. The method 900 includes enabling 920 downlink transmissions to the UE in response to receiving an RRC layer connection resume request from the UE. The method 900 ends.

Disclosed herein is a first apparatus for suspending a connection of one SIM during multi-SIM operation, according to embodiments of the disclosure. The first apparatus may be implemented by a UE, such as the remote unit 105, the multi-SIM UE 205, and/or the user equipment apparatus 600. The first apparatus includes a processor, a first SIM registered with a first mobile communication network, a second SIM registered with a second mobile communication network, and a transceiver that communicates with the first and second mobile communication networks. The processor receives a communication trigger associated with the first SIM, the communication trigger indicating a service type and determines whether to apply a short connection suspension for the second SIM or a long connection suspension for the second SIM, said determination based on the service type. The processor additionally applies the selected one of the short connection suspension and the long connection suspension for the second SIM.

In some embodiments, an application or service type associated with the first SIM is configured with higher priority than an application or service currently in use with the second SIM. In certain embodiments, the processor determines not to suspend the connection for the second SIM if the second SIM is involved in emergency communication session.

In some embodiments, applying the short connection suspension for the second SIM includes transmitting an RRC layer suspension request, while applying the long connection suspension for the second SIM includes transmitting an NAS layer suspension request. In certain embodiments, applying the long connection suspension for the second SIM further includes transitioning to an NAS idle state in response to reception of a suspension response message from the second network, wherein the suspension response message includes one or more of: an RRC layer message or NAS layer message. Here, the suspension response message sent as response to the NAS layer suspension request message.

In certain embodiments, applying the short connection suspension further includes the processor disabling transmissions for the second SIM in response to receiving an RRC layer suspension response. In certain embodiments, applying the short connection suspension includes the processor maintaining an Access Stratum context for the second SIM.

In some embodiments, registering the first SIM and the second SIM includes indicating support for one or more of the following parameters: multi SIM enhancements, the short connection suspension, or long connection suspension, receiving a network preference indicating whether to apply multi SIM enhancements, or the short connection suspension, or long connection suspension, and configuring the processor whether to apply multi SIM enhancements, or the short connection suspension, or long connection suspension based on the received network preference. In certain embodiments, not receiving any network preference may be interpreted by the UE as an indication of non-support of multi SIM enhancements in the network.

In various embodiments, the processor activates a connection associated with the first SIM, performs communication corresponding to the communication trigger, and sends release assistance information in response to ending the communication corresponding to the communication trigger, the release assistance information including one or more of: Access Stratum release assistance information and Non-Access Stratum release assistance information. In such embodiments, the processor further resumes the suspended connection in the second communication network associated with the second SIM in response to ending the communication corresponding to the communication trigger. In certain embodiments, resuming the suspended connection includes one or more of: sending an RRC layer connection resume request in response to transmitting the RRC layer suspension request; and sending a NAS layer resume request in response to transmitting the NAS layer suspension request.

In some embodiments, the transceiver further receives a suspension timer value associated with the short connection suspension for the second SIM, wherein the processor initiates the suspension timer in response to receiving the RRC layer suspension response and transitions from the short connection suspension to the long connection suspension in response to expiry of the suspension timer. In some embodiments, determining whether to apply a short connection suspension for the second SIM or a long connection suspension for the second SIM is further based on a bearer type associated with the second SIM, wherein the processor determines to apply the long connection suspension in response to the second SIM being associated with a guaranteed bit rate bearer.

Disclosed herein is a first method for suspending a connection of one SIM during multi-SIM operation, according to embodiments of the disclosure. The first method may be performed by a UE, such as the remote unit 105, the multi-SIM UE 205, and/or the user equipment apparatus 600. The first method includes registering a first SIM with a first mobile communication network and registering a second SIM with a second mobile communication network. The first method includes receiving a communication trigger associated with the first SIM, the communication trigger indicating a service type and determining whether to apply a short connection suspension for the second SIM or a long connection suspension for the second SIM. Here, the determination is based on the service type. The first method includes applying one of the short connection suspension and the long connection suspension for the second SIM.

In some embodiments, applying the short connection suspension for the second SIM includes transmitting an RRC layer suspension request and applying the long connection suspension for the second SIM includes transmitting an NAS layer suspension request. In certain embodiments, applying the long connection suspension for the second SIM further includes: transitioning to an NAS idle state in response to reception of a suspension response message from the second network. In such embodiments, the suspension response message includes one or more of: an RRC layer message or NAS layer message. Here, the suspension response message is a response to the NAS layer suspension request message. In certain embodiments, applying the short connection suspension further includes disabling transmissions for the second SIM in response to receiving an RRC layer suspension response. In certain embodiments, applying the short connection suspension includes maintaining an Access Stratum context for the second SIM.

In some embodiments, registering the first SIM and the second SIM includes indicating device support for one or more of the following parameters: multi SIM enhancements, the short connection suspension, or long connection suspension. In such embodiments, registering the first SIM and the second SIM also includes receiving a network preference indicating whether to apply multi SIM enhancements, or the short connection suspension, or long connection suspension, and configuring the device to apply multi SIM enhancements, or the short connection suspension, or long connection suspension based on the received network preference.

In some embodiments, the first method includes receiving a suspension timer value associated with the short connection suspension for the second SIM, initiating the suspension timer in response to receiving the RRC layer suspension response, and transitioning from the short connection suspension to the long connection suspension in response to expiry of the suspension timer.

In some embodiments, the first method includes activating a connection associated with the first SIM, performing communication corresponding to the communication trigger, and sending release assistance information in response to ending the communication corresponding to the communication trigger, the release assistance information including one or more of: Access Stratum release assistance information and Non-Access Stratum release assistance information. In such embodiments, the first method may also include including resuming the suspended connection in the second communication network associated with the second SIM in response to ending the communication corresponding to the communication trigger. In certain embodiments, resuming the suspended connection includes one or more of: sending an RRC layer connection resume request in response to transmitting the RRC layer suspension request; and sending a NAS layer resume request in response to transmitting the NAS layer suspension request.

In certain embodiments, an application or service type associated with the first SIM is configured with higher priority than an application or service currently in use with the second SIM. In some embodiments, the first method includes determining not to suspend the connection for the second SIM if the second SIM is involved in emergency communication session.

In certain embodiments, determining whether to apply a short connection suspension for the second SIM or a long connection suspension for the second SIM is further based on a bearer type associated with the second SIM. In such embodiments, applying one of the short connection suspension and the long connection suspension for the second SIM includes applying the long connection suspension in response to the second SIM being associated with a guaranteed bit rate bearer.

Disclosed herein is a second apparatus for suspending a connection of one SIM during multi-SIM operation, according to embodiments of the disclosure. The second apparatus may be implemented by a RAN node, such as the base unit 121, the (R)AN-1 node 410, and/or the network equipment apparatus 700. The second apparatus includes a processor and a transceiver that receives an RRC layer suspension request from a remote unit. The processor maintains a UE AS context for the remote unit in response to the RRC layer suspension request. The processor also disables downlink transmissions to the remote unit in response to the RRC layer suspension request and enables downlink transmissions to the remote unit in response to receiving an RRC layer connection resume request from the remote unit.

In certain embodiments, the transceiver further transmits a suspension timer value associated with the short connection suspension for the second SIM, wherein the processor releases the UE AS context in response to expiry of the suspension timer. In such embodiments, the transceiver may also indicate a type of suspend state to the remote unit, wherein the remote unit is to transition to the indicated suspend state in response to expiry of the suspension timer.

In some embodiments, the processor further buffers downlink packets for the remote unit in response to the RRC layer suspension request, wherein the transceiver attempts to deliver the buffered downlink packets in response to receiving the RRC layer connection resume request from the remote unit. In certain embodiments, the processor further suppresses a RAN paging procedure for the remote unit in response to receiving the RRC layer suspension request and stops suppressing the RAN paging procedure for the remote unit in response to receiving the RRC layer connection resume request.

Disclosed herein is a second method for suspending a connection of one SIM during multi-SIM operation, according to embodiments of the disclosure. The second method may be performed by a RAN node, such as the base unit 121, the (R)AN-1 node 410, and/or the network equipment apparatus 700. The second method includes receiving an RRC layer suspension request from a remote unit and maintaining a UE AS context for the remote unit (e.g., in response to receiving the RRC layer suspension request). The second method includes disabling downlink transmissions to the remote unit in response to the RRC layer suspension request and enabling downlink transmissions to the remote unit in response to receiving an RRC layer connection resume request from the remote unit.

In some embodiments, the second method includes transmitting, to the remote unit, a suspension timer value associated with the short connection suspension for the second SIM and releasing the UE AS context in response to expiry of the suspension timer. In certain embodiments, the second method also includes indicating a type of suspend state to the remote unit, wherein the remote unit is to transition to the indicated suspend state in response to expiry of the suspension timer.

In some embodiments, the second method includes buffering downlink packets for the remote unit in response to the RRC layer suspension request and attempting to deliver the buffered downlink packets in response to receiving the RRC layer connection resume request from the remote unit. In some embodiments, the second method includes suppressing suppresses a RAN paging procedure for the remote unit in response to receiving the RRC layer suspension request and stopping suppression of the RAN paging procedure for the remote unit in response to receiving the RRC layer connection resume request.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a first subscriber identity module ("SIM") registered with a first mobile communication network;
a second SIM registered with a second mobile communication network;
a processor; and
a memory coupled to the processor, the processor configured to:
communicate in a connected state with the second mobile communication network;
detects activity associated with the first SIM; and
transmit a connection release request message from the connected state for the second SIM, in response to the detected activity associated with the first SIM, by transmitting one of a radio resource control ("RRC") layer request message indicating a connection release and a non-access-stratum ("NAS") layer request message indicating the connection release;
initiate a state transition timer based on a transmission of the connection release request message; and
transition to an idle state in response to expiry of the state transition timer without a reception of a response message from the second mobile communication network.

2. The apparatus of claim 1, wherein an application or service type associated with the first SIM is configured with a higher priority than an application or service currently in use with the second SIM.

3. The apparatus of claim 1, wherein the processor is configured to determine whether to apply a RRC connection release for a connection associated with the second SIM or to apply a NAS connection release for the connection associated with the second SIM, the determination based on an application or service type associated with the connection associated with the second SIM.

4. The apparatus of claim 3, wherein, to apply the NAS connection release, the processor is configured to cause the apparatus to transition to an NAS idle state in response to reception of a release response message from the second mobile communication network, wherein the release response message comprises: a RRC layer message or NAS layer message, or a combination thereof, the release response message sent as response to the NAS layer request message.

5. The apparatus of claim 3, wherein, to apply the RRC connection release, the processor is configured to cause the apparatus to disable transmissions for the second SIM while remaining in connected state in response to receiving an RRC layer release response.

6. The apparatus of claim 3, wherein, to apply the RRC connection release, the processor is configured to cause the apparatus to maintain an Access Stratum ("AS") context for the second SIM.

7. The apparatus of claim 3, wherein the processor is configured to cause the apparatus to:
receive a state transition timer value associated with the RRC connection release for the second SIM;
initiate the state transition timer in response to a transmission of the connection release request message.

8. The apparatus of claim 3, wherein the processor is configured to cause the apparatus to:
receive a transmission suspension timer value associated with the RRC connection release for the second SIM; and
disable a data transmission while the transmission suspension timer value is running.

9. The apparatus of claim 1, wherein the processor is configured to cause the apparatus to:
indicate support for one or more of the following parameters: multi-SIM enhancements, RRC connection release, or NAS connection release; and
receive a network preference indicating whether to apply multi-SIM enhancements, or RRC connection release, or NAS connection release,
wherein the connection release from the connected state for the second SIM is performed based on the received network preference.

10. The apparatus of claim 1, wherein the processor is configured to cause the apparatus to:
activate a connection associated with the first SIM;
perform communication corresponding to a communication trigger; and
send release assistance information in response to ending the communication corresponding to the communication trigger, the release assistance information comprising one or more of: Access Stratum ("AS") release assistance information and NAS release assistance information.

11. The apparatus of claim 10, wherein the processor is configured to cause the apparatus to resume a released connection in the second mobile communication network associated with the second SIM in response to ending the communication corresponding to the communication trigger.

12. The apparatus of claim 11, wherein, to resume the released connection, the processor is configured to cause the apparatus to send a RRC layer connection resume request in response to transmitting the RRC layer request message; or send a NAS layer resume request in response to transmitting the NAS layer request message.

13. The apparatus of claim 1, wherein the processor is configured to determine to release the connected state of the second SIM in response to the second SIM not being involved in emergency communication session.

14. The apparatus of claim 13, wherein the processor is configured to determine whether to apply a RRC connection release for the second SIM or a NAS connection release for the second SIM based on a bearer type associated with the second SIM, wherein the processor determines to apply the NAS connection release in response to the second SIM being associated with a guaranteed bit rate bearer.

15. A method comprising:
registering a first subscriber identity module ("SIM") with a first mobile communication network;
registering a second SIM with a second mobile communication network;
communicating in a connected state with the second mobile communication network;
detecting activity associated with the first SIM; and
transmitting a connection release request message from the connected state for the second SIM, in response to the detected activity associated with the first SIM, by transmitting one of a radio resource control ("RRC") layer request message indicating a connection release and a non-access-stratum ("NAS") layer request message indicating the connection release;
initiating a state transition timer based on a transmission of the connection release request message; and
transitioning to an idle state in response to expiry of the state transition timer without a reception of a response message from the second mobile communication network.

16. An apparatus comprising:
a processor that:
a memory coupled to the processor, the processor configured to:
receive, from a user equipment ("UE"), a radio resource control ("RRC") layer request message for connection release associated with a transmission suspension time;
transmit a connection release response message comprising a timer value for a state transition timer;
maintain a user equipment access stratum ("UE AS") context for the UE in a connected state;
disable downlink transmissions to the UE during the transmission suspension time in response to the RRC layer request message; and
release the UE AS context in response to expiry of the state transition timer.

17. The apparatus of claim 16, wherein the processor is configured to cause the apparatus to:
transmit a second timer value for a suspension timer associated with the connection release for the transmission suspension time, and
release the UE AS context in response to expiry of the suspension timer.

18. The apparatus of claim 17, wherein the processor is configured to cause the apparatus to indicate, to the UE, a type of suspend state, wherein expiry of the suspension timer triggers transition of the UE state to the indicated suspend state.

19. The apparatus of claim 16, wherein the processor is configured to cause the apparatus to:
buffer downlink packets for the UE in response to the RRC layer request message;
enable downlink transmissions to the UE in response to receiving an RRC layer connection resume request from the UE; and
attempt delivery of the buffered downlink packets in response to receiving the RRC layer connection resume request from the UE.

20. The apparatus of claim 16, wherein the processor is configured to cause the apparatus to:
suppress a radio access network ("RAN") paging procedure for the UE in response to receiving the RRC layer request message; and
stop suppressing the RAN paging procedure for the UE in response to receiving an RRC layer connection resume request.

21. A method comprising:
receiving, from a user equipment ("UE"), a radio resource control ("RRC") layer request message for connection release for associated with a transmission suspension time;
transmitting a connection release response message comprising a timer value for a state transition timer;
maintaining a UE access stratum ("UE AS") context for the UE in a connected state; and
disabling downlink transmission to the UE during the transmission suspension time in response to the RRC layer request message; and
releasing the UE AS context in response to expiry of the state transition timer.

* * * * *